United States Patent
Vanka et al.

(10) Patent No.: US 11,269,430 B2
(45) Date of Patent: Mar. 8, 2022

(54) STYLUS INK PARAMETER SETTING

(71) Applicant: Lenovo (Singapore) Pte. Ltd., Singapore (SG)

(72) Inventors: Mounika Vanka, Durham, NC (US); David Alexander Schwarz, Morrisville, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/836,413

(22) Filed: Mar. 31, 2020

(65) Prior Publication Data
US 2021/0303087 A1    Sep. 30, 2021

(51) Int. Cl.
*G06F 3/0354* (2013.01)
*G06F 3/16* (2006.01)
*G06F 3/0482* (2013.01)
*G06F 3/0487* (2013.01)

(52) U.S. Cl.
CPC ........ *G06F 3/03545* (2013.01); *G06F 3/0482* (2013.01); *G06F 3/0487* (2013.01); *G06F 3/167* (2013.01)

(58) Field of Classification Search
CPC .... G06F 3/03545; G06F 3/167; G06F 3/0487; G06F 3/0482
See application file for complete search history.

(56) References Cited

U.S. PATENT DOCUMENTS

| | | | | |
|---|---|---|---|---|
| 2001/0025289 A1* | 9/2001 | Jenkins | ............... | G06F 1/3203 708/141 |
| 2003/0055655 A1* | 3/2003 | Suominen | ............. | G06F 3/167 704/276 |
| 2003/0135663 A1* | 7/2003 | Duncan | ............... | G06F 9/4411 719/321 |
| 2009/0022332 A1* | 1/2009 | Van Schaack | ........ | H04R 5/027 381/71.1 |
| 2014/0362024 A1* | 12/2014 | Hicks | ................. | G06F 3/03545 345/174 |
| 2015/0025883 A1* | 1/2015 | Koo | ....................... | G06F 3/167 704/235 |
| 2019/0179431 A1* | 6/2019 | Klein | ................. | G06F 3/03545 |

OTHER PUBLICATIONS

Hu et al., InkChat: A Collaboration Tool for Mathematics, CICM Workshops, Jul. 2013, (https://www.researchgate.net/publication/283507333) (9 pages).
Patel, CAVVO Control Center Review: The Best Universal Remote, The Verge, Feb. 27, 2019 (https://www.theverge.com/2019/2/27/18243119/) (6 pages).
Microsoft, Surface Pen Fact Sheet, May 2017 (3 pages).

(Continued)

*Primary Examiner* — Benyam Ketema
(74) *Attorney, Agent, or Firm* — Brian J. Pangrle

(57) ABSTRACT

A method can include, during execution of an application with drawing capabilities, recognizing input received via a microphone; setting a stylus ink parameter based on the recognized input; receiving drawing input via a stylus; and, via the application, rendering a graphical user interface to a display according to the stylus ink parameter and the drawing input.

20 Claims, 12 Drawing Sheets

(56) References Cited

OTHER PUBLICATIONS

Apple, Speech Recognizer (https://developer.apple.com/documentation/speech) (2 pages).
Microsoft, UI Automation Fundamentals, May 2018 (https://docs.microsoft.com/en-US/windows/win32/winauto/entry-uiautocore-overview) (1 page).
Microsoft, uiautomationcore.h header (https://docs.microsoft.com/en-us/windows/win32/api/uiautomationcore/), Jan. 11, 2019 (5 pages).
Ink Markup Language (InkML) W3C Recommendation, Sep. 20, 2011 (46 pages).

* cited by examiner

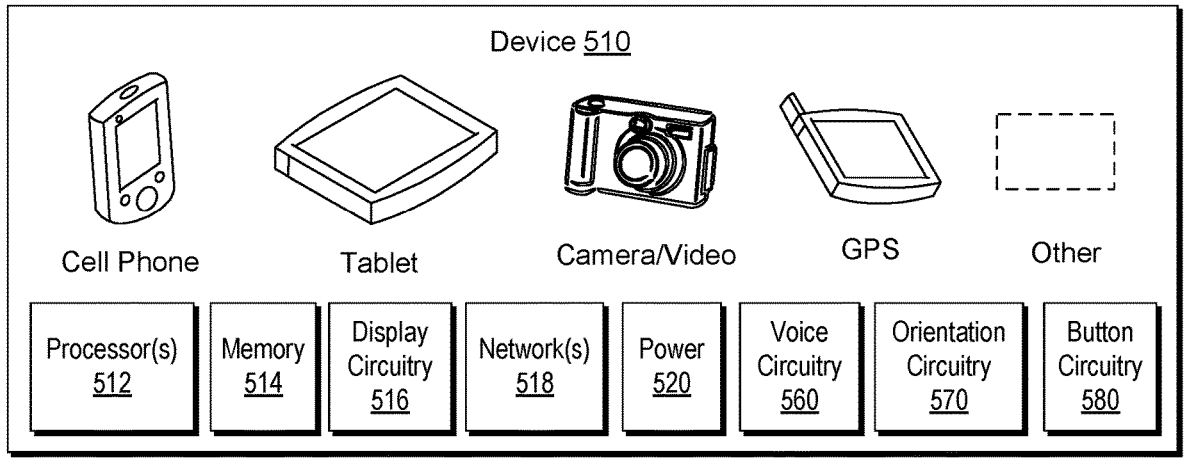
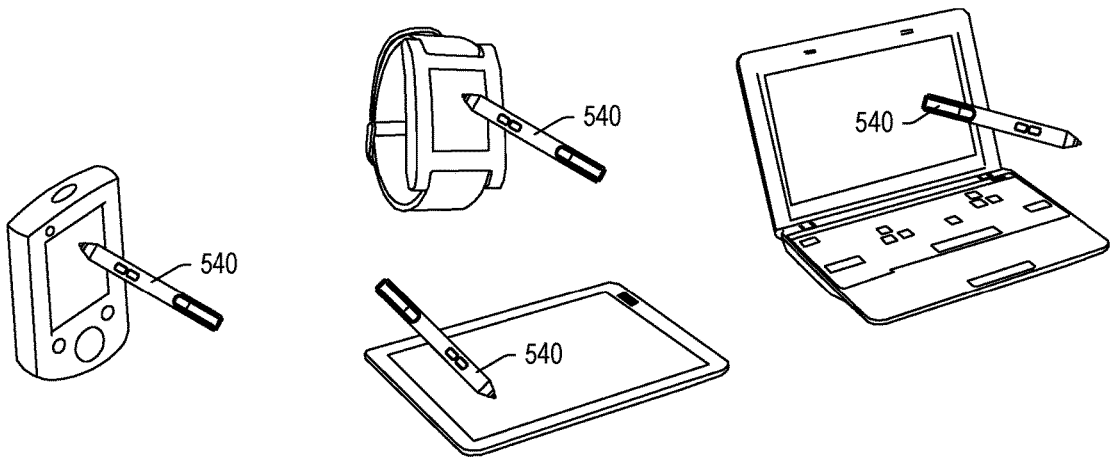
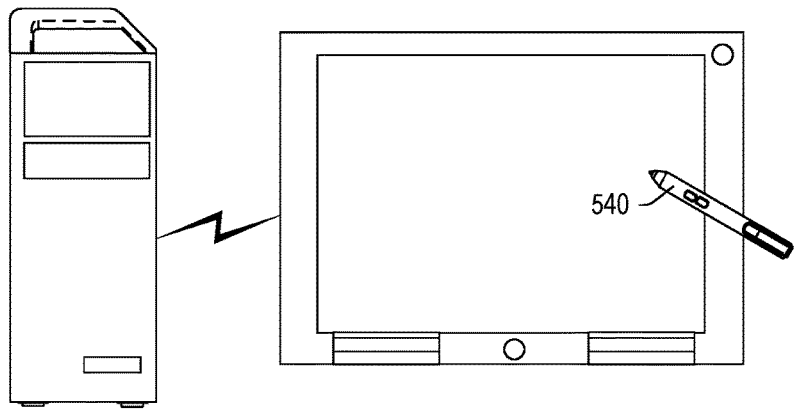
FIG. 5

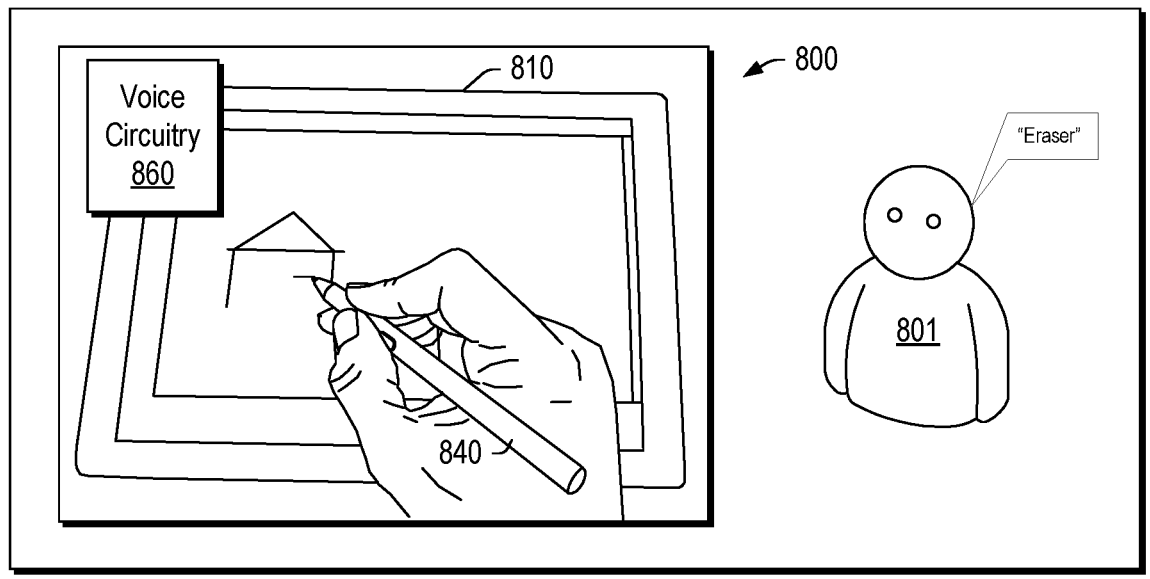
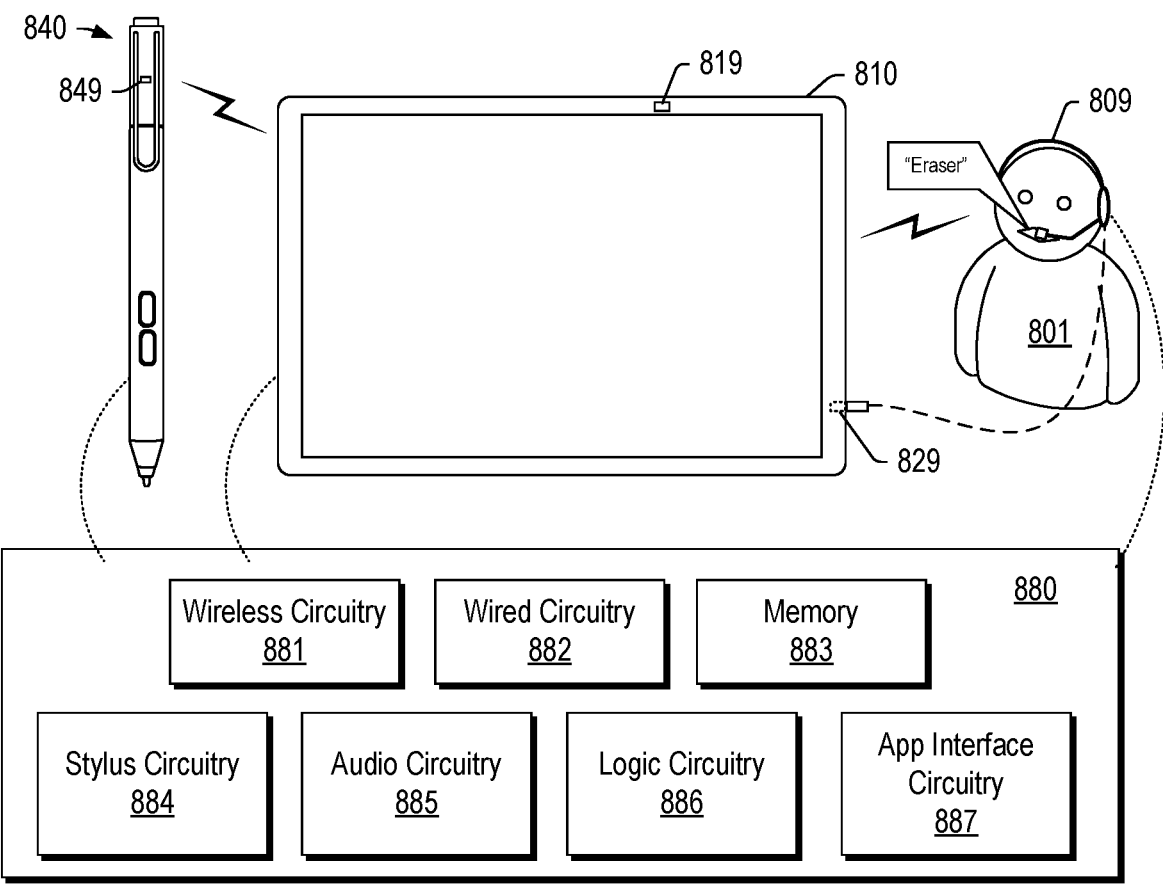
FIG. 8

Example Parameters 900

| Channel Name | Dimension | Default | Interpretation |
|---|---|---|---|
| X | length | mm | X coordinate. This is the horizontal pen position on the writing surface, increasing to the right for +ve orientation. |
| Y | length | mm | Y coordinate. This is the vertical position on the writing surface, increasing downward for +ve orientation. |
| Z | length | mm | Z coordinate. This is the height of pen above the writing surface, increasing upward for +ve orientation. |
| F | force | % | pen tip force |
| S | | | tip switch state (touching/not touching the writing surface) |
| B1...Bn | | | side button states |
| OTx | angle | deg | tilt along the x-axis |
| OTy | angle | deg | tilt along the y-axis |
| OA | angle | deg | azimuth angle of the pen (yaw) |
| OE | angle | deg | elevation angle of the pen (pitch) |
| OR | angle | deg | rotation (counter-clockwise rotation about pen axis ) |
| C | | | color value as an RGB octet triple (i.e. #000000 to #FFFFFF). |
| CR,CG,CB | | | color values (Red/Green/Blue) |
| CC,CM,CY,CK | | | color values (Cyan/Magenta/Yellow/Black) |
| A | | | transparency (device-specific encoding) |
| W | length | mm | stroke width (orthogonal to stroke) |
| BW | length | mm | brush width |
| BH | length | mm | brush height |
| T | time | ms | time (of the sample point) |

FIG. 9

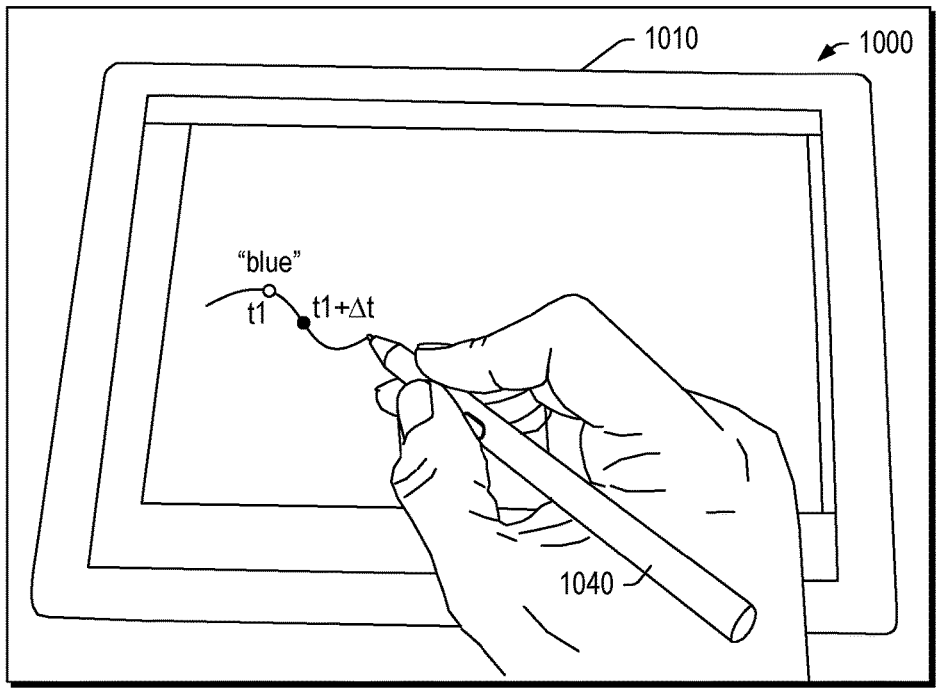
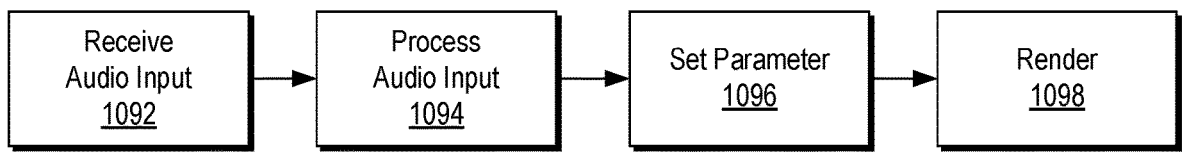
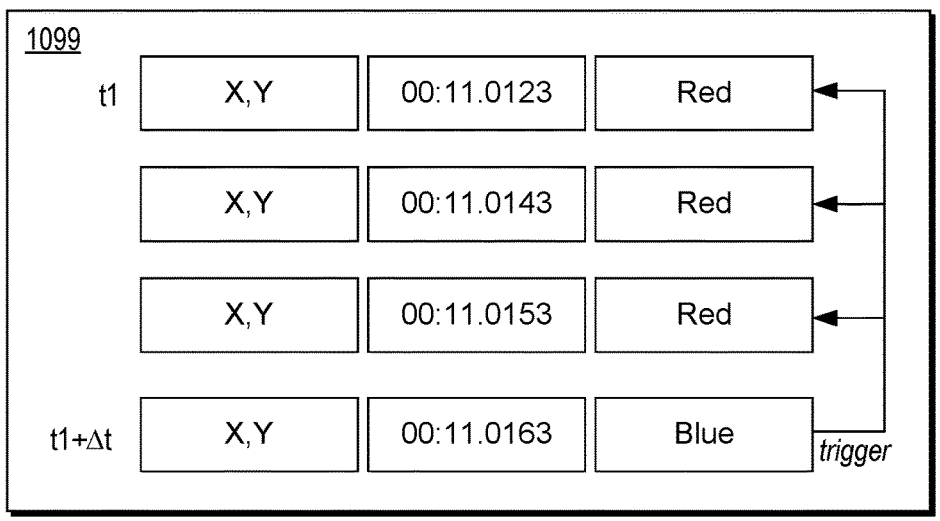
FIG. 10

STYLUS INK PARAMETER SETTING

TECHNICAL FIELD

Subject matter disclosed herein generally relates to styli for devices.

BACKGROUND

Various types of devices may include a stylus, for example, to facilitate input.

SUMMARY

A method can include, during execution of an application with drawing capabilities, recognizing input received via a microphone; setting a stylus ink parameter based on the recognized input; receiving drawing input via a stylus; and, via the application, rendering a graphical user interface to a display according to the stylus ink parameter and the drawing input. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 5 is a series of diagrams of examples of devices and an example of a stylus;

FIG. 8 is a series of diagrams of an example of a system and examples of components of a system;

FIG. 9 is a table of examples of parameters;

FIG. 10 is a series of diagrams of an example of a system, an example of a method, and an example of a data structure;

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
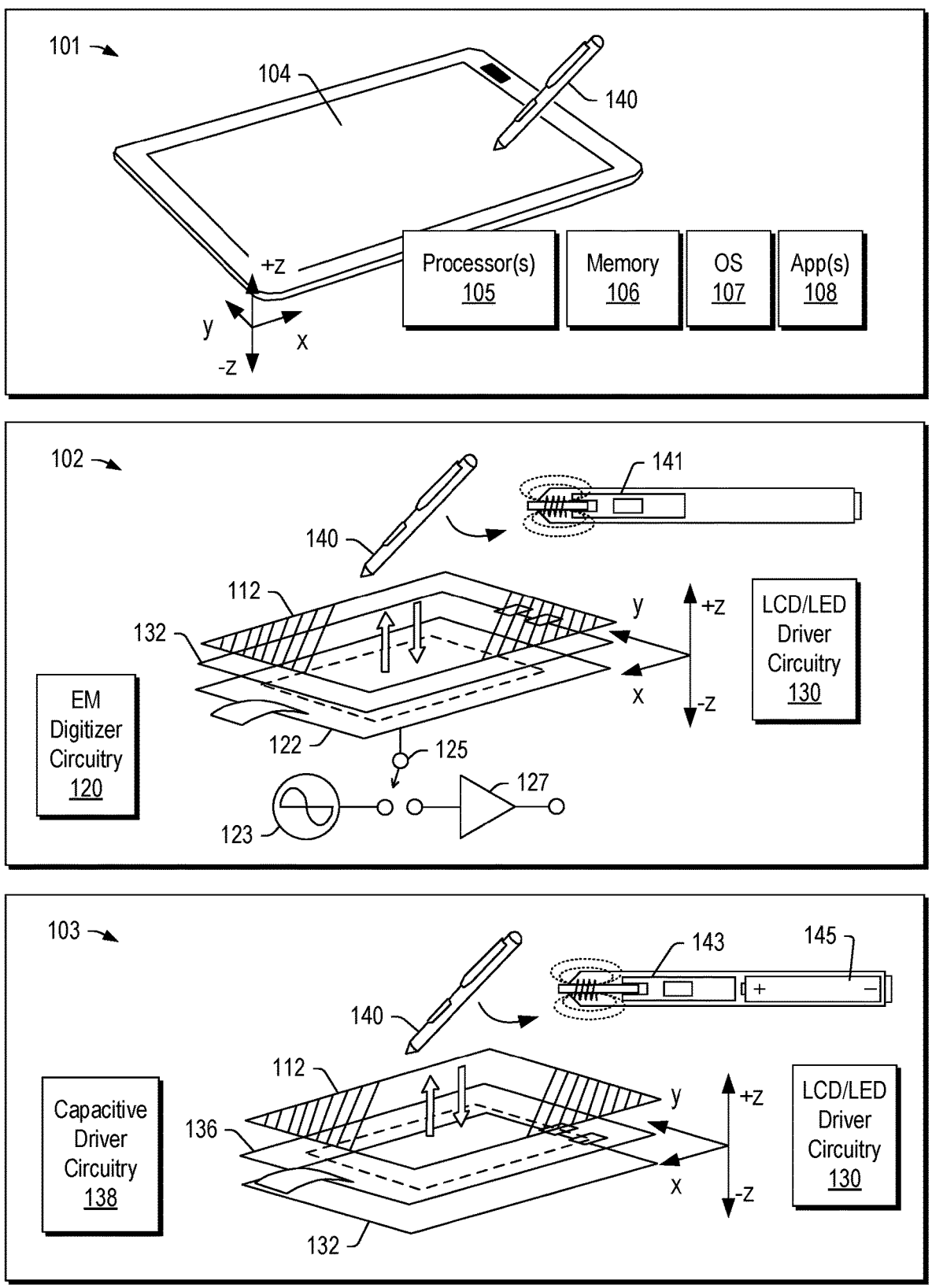
FIG. 1 is a series of diagrams of an example of a device and examples of arrangements of components.

FIG. 1 shows an example of a device 101 and examples of arrangements of physical panels 102 and 103 that may, for example, be included in the device 101. Each of the arrangements 102 and 103 is shown along with a Cartesian coordinate system that includes x, y and z axes. Various features of the device 101 and the arrangements 102 and 103 may optionally be described with respect to the Cartesian coordinate system. For example, length (e.g., along an x-axis), width (e.g., along a y-axis), depth (e.g., along a z-axis), aspect ratios, relationships between features, etc. may be described with respect to the Cartesian coordinate system.

In FIG. 1, the device 101 includes a display 104, one or more processors 105, memory 106, an operating system 107 (e.g., or operating systems) and one or more applications 108. In the example of FIG. 1, a stylus 140 may be used to input information such as, for example, commands, selections, digital ink, etc. As an example, an operating system environment may be established by executing instructions of the operating system 107 stored in the memory 106 of the device 101 using at least one of the one or more processors 105. In such an example, the operating system environment 107 may call for rendering information to the display 104, receiving and processing input via a surface (e.g., a surface of the display 104) using a stylus (e.g., the stylus 140), etc. As an example, an application may be executable in an established operating system environment, for example, to provide for drawing, handwriting recognition, photo editing, etc. through, in part, use of a stylus.

In FIG. 1, the example arrangement 102 includes a panel 112, an electromagnetic digitizer panel 122, electromagnetic digitizer circuitry 120, an LCD and/or LED panel display 132 with associated driver circuitry 130, and the stylus 140. While LCD may be an acronym for "liquid crystal display", LCD finds uses as "LCD display", for example, as an adjective for "display" (e.g., a type of display). LED is an acronym for "light emitting diode". As an example, a display may include a panel that includes LEDs (e.g., an LED panel display).

In the arrangement 102, the panel display 132 is disposed at least in part between the panel 112 and the electromagnetic digitizer panel 122. In such an example, fields are transmitted through the panel display 132.

In the arrangement 102, as an example, energy may be induced in resonant circuitry 141 of the stylus 140 by a field generated by the electromagnetic digitizer panel 122. The resonant circuitry 141 of the stylus 140 may then make use of this energy to return a signal to the electromagnetic digitizer panel 122 where input signals may determine, for example, one or more of coordinate position, angle, speed, writing pressure, etc. As shown in FIG. 1, circuitry may be configured to switch a field on and off and to receive input signals. For example, the EM digitizer circuitry 120 may include or be operatively coupled to a high frequency source 123, a transmission and reception switch 125 (e.g., a coil switch) and a receiver 127.

As an example, an electromagnetic digitizer panel may include a sheet manufactured from glass epoxy resin or from a polyimide and PET formed film in which a large number of overlapping loop coils are arranged in a matrix in the x and y axis directions.

As an example, the circuitry 120 may discharge alternating current to selected loop coils from among the array of the electromagnetic digitizer panel 122 to excite the coils, causing them to generate fields. When the stylus 140 passes through these fields, it may pick up and store energy in its resonant circuitry 141. As an example, the circuitry 120 may detect an approximate location of the stylus 140, for example, by scanning the loop coils, which may include scanning multiple loop coils in the vicinity of approximate location of the stylus 140 to determine coordinate values more precisely.

In the arrangement 102, a location of the stylus 140 may be determined, for example, where the stylus 140 may be positioned a short distance from the electromagnetic digitizer panel 122 (e.g., an effective operational distance).

As an example, the circuitry 120 may include a digital signal processing (DSP) circuit for processing input. As an example, the circuitry 120 may be operatively coupled to a processor of a device (e.g., CPU, etc.). As an example, the circuitry 120 may include a DSP circuit and be operatively coupled to a processor of a device such as one of the one or more processors 105 of the device 101.

In FIG. 1, the example arrangement 103 includes a panel 112, an LCD and/or LED display panel 132 and associated driver circuitry 130 as well as an active capacitive panel 136, associated driver circuitry 138 and the stylus 140.

As shown in the arrangement 103, the stylus 140 can include circuitry 143 and a power source 145 (e.g., a battery). As an example, a stylus with a power source may optionally be implemented for the arrangement 102. Where a stylus includes a power source, the stylus may optionally include circuitry such as, for example, BLUETOOTH™ circuitry where signals may be communicated to a device that includes BLUETOOTH™ circuitry (e.g., the device 101 may include BLUETOOTH™ circuitry).

In the arrangement 103, the panel 136 can include translucent (e.g., "transparent") circuitry, for example, consider a panel that include circuitry formed at least in part of indium-tin-oxide (ITO). In such an example, visible electromagnetic emissions of the display panel 132 (e.g., as rendered via circuitry of the device 101) may be readily seen through the panel 136.

As an example, the panel 136 can include sensors that can sense changes in electrical current generated by proximity of an object such as a finger of a hand, an object that can cause changes in electrostatic capacity (e.g., load), etc. Such sensors may respond to presence of static electrical capacity of a finger as it approaches the panel. As an example, the panel 136 may include one or more types of circuitry. For example, consider surface capacitive circuitry and/or projective capacitive circuitry.

As an example, a panel can include drive electrodes and receive electrodes. In such an example, charge may be provided to the drive electrodes such that electric fields are formed with respect to the receive electrodes. The electric fields may be referred to as a "projected" electric field (e.g., projected capacitance of "p-cap").

As an example, a projected electric field may be available for "field coupling" by introduction of a conductive object (e.g., a hand, a stylus, etc.). For example, a portion of a projected electric field may couple with a conductive object, which leaves a remaining portion of the projected electric field coupling with one or more receive electrodes. In such an example, the field coupling with the conductive object acts to reduce charge collected by a receive electrode or receive electrodes. In turn, the collected charge may be used as an indicator of the conductive object being at or near a particular surface location on the panel (e.g., a particular x,y location in an x,y-plane).

As to techniques for measuring collected charge, as an example, an integrator may be implemented that integrates collected charge with respect to time. In such an example, drive electrodes may be driven using time pulses (e.g., regular approximately square wave pulses). Such a technique may act to help discriminate touches from noise, etc. As an example, a change in collected charge may be deemed a change in capacitance, for example, as a conductive object may introduce parasitic capacitance to circuitry of a touchscreen.

As an example, the panel 136 may include a conductive layer etched to form an x-y grid that can be driven by, for example, drive lines (e.g., running along the y direction) and where sensing may occur along sense lines (e.g., running along the x direction).

In such an example, the panel 136 may mutual include capacitive sensors (e.g., a capacitor at each intersection of each row and each column). As mentioned, charge (e.g., voltage) may be applied to the drive lines such that bringing a conductive object near one or more of the capacitive sensor changes the projected electric field in a localized manner that reduces mutual capacitance. For example, the capacitance change at individual points on a grid may be measured to determine a touch location (e.g., or touch locations) by measuring voltage (e.g., collected charge).

A mutual capacitance method may include providing drive electrodes and receive electrodes organized as a matrix (e.g., an array) and measuring capacitive coupling at points in the matrix, which, in turn, in the presence of a touch or touches, may act to locate the touch or touches with respect to the matrix.

As to the circuitry 138, in the example of FIG. 1, it may include a signal source operatively coupled to the drive lines of the panel 136, a multiplexer operatively coupled to the sense lines of the panel and an analog-to-digital converter (ADC), for example, to convert sensed analog signals of the sense lines received via the multiplexer to digital signals. As an example, the circuitry 138 may include digital signal processing (DSP) circuitry that can receive digital signals and provide output based at least in part on digital signal processing. As an example, DSP circuitry may receive an output array from the circuitry 138 where values in the array represent capacitance at, for example, x-y intersections of a mutual capacitance grid of the panel 136.

As mentioned, the stylus 140 may include the power source 145. In such an example, the circuitry 143 may emit an electrostatic signal (e.g., or other signals) that can be sensed by sense lines. For example, the circuitry 143 may include one or more antennas (e.g., coils, etc.) that can emit an electrostatic signal (or electrostatic signals). As an example, a junction or junctions of drive and sense lines (e.g., intersections of rows and columns) may receive signals emitted by the circuitry 143 of the stylus 140, which may be correlated to position of the stylus 140. Such an approach may be referred to as an "active capacitive" approach as the stylus 140 is "active" in that it can emit an electrostatic signal as generated at least in part via energy from the power source 145.

As an example, a stylus that includes a power source may include circuitry that can emit signals where one or more parameters of the signals may differ. In such an example, a particular signal may correspond to a command, for example, received and processed by a device such as the device 101 of FIG. 1. As an example, a stylus may include one or more buttons that may be actuatable (e.g., depressible, etc.) to cause circuitry of the stylus to emit a particular signal. As another example, consider a nib of a stylus that can respond to pressure upon contact of the nib with a surface. In such an example, the stylus may emit one or more signals that carry pressure information (e.g., how much pressure is being applied to the nib).

As an example, an active capacitive digitizer may be operative via circuitry that can also sense touch (e.g., a human finger, etc.). For example, an active capacitive digitizer may operate via drive and sense lines that can also be implemented to sense touch. In the arrangement 102, where touch sensing is desired, another panel may be included, which may increase device size, weight, etc.

As an example, a device may be operable in conjunction with an electrostatic stylus that may not include a power source and/or may be operable in conjunction with an electrostatic stylus that may include a power source (e.g., one or more batteries).

As an example, a stylus may include a conductive capacitor that can receive energy emitted by an electromagnetic field of a device (e.g., via an excitation coil, etc.). In such an example, one or more frequencies (e.g., of electromagnetic waves) may be controllable via a device. As an example, such a stylus may be considered to be a parasitic stylus as it derives its power from being in proximity to a device that emits electromagnetic energy.

As an example, a stylus may include a power source (e.g., one or more batteries). As an example, such a stylus may be considered to be an active stylus as it derives its power at least in part from an internal power source (e.g., an electrochemical power source). As an example, circuitry of a device may identify position of a stylus based at least in part via emissions of the stylus where such emissions are powered by a power source of the stylus. In such an example, the stylus may emit energy as to one or more other types of "information". For example, where a stylus includes a nib that can be pressed against a surface, the nib may be operatively coupled to a pressure circuit that may sense pressure, displacement, etc. In such an example, the stylus may emit energy that carries "pressure" information (e.g., a pressure level, etc.).

As an example, a stylus may include one or more buttons. As an example, a stylus that includes a power source (e.g., one or more batteries) may include one or more buttons. In such an example, a button may be actuated to cause circuitry powered by the power source to emit energy. Such energy may be sensed by a device and, for example, be processed as a command. As an example, a command may call for performing a function by the device. In such an example, the button may have a dedicated function. As an example, a function of such a button may be fixed (e.g., fixed via circuitry, optionally "hardwired", etc.) or may be assignable, for example, via a graphical user interface (GUI) that may be rendered to a display of a device.

Figure 2:
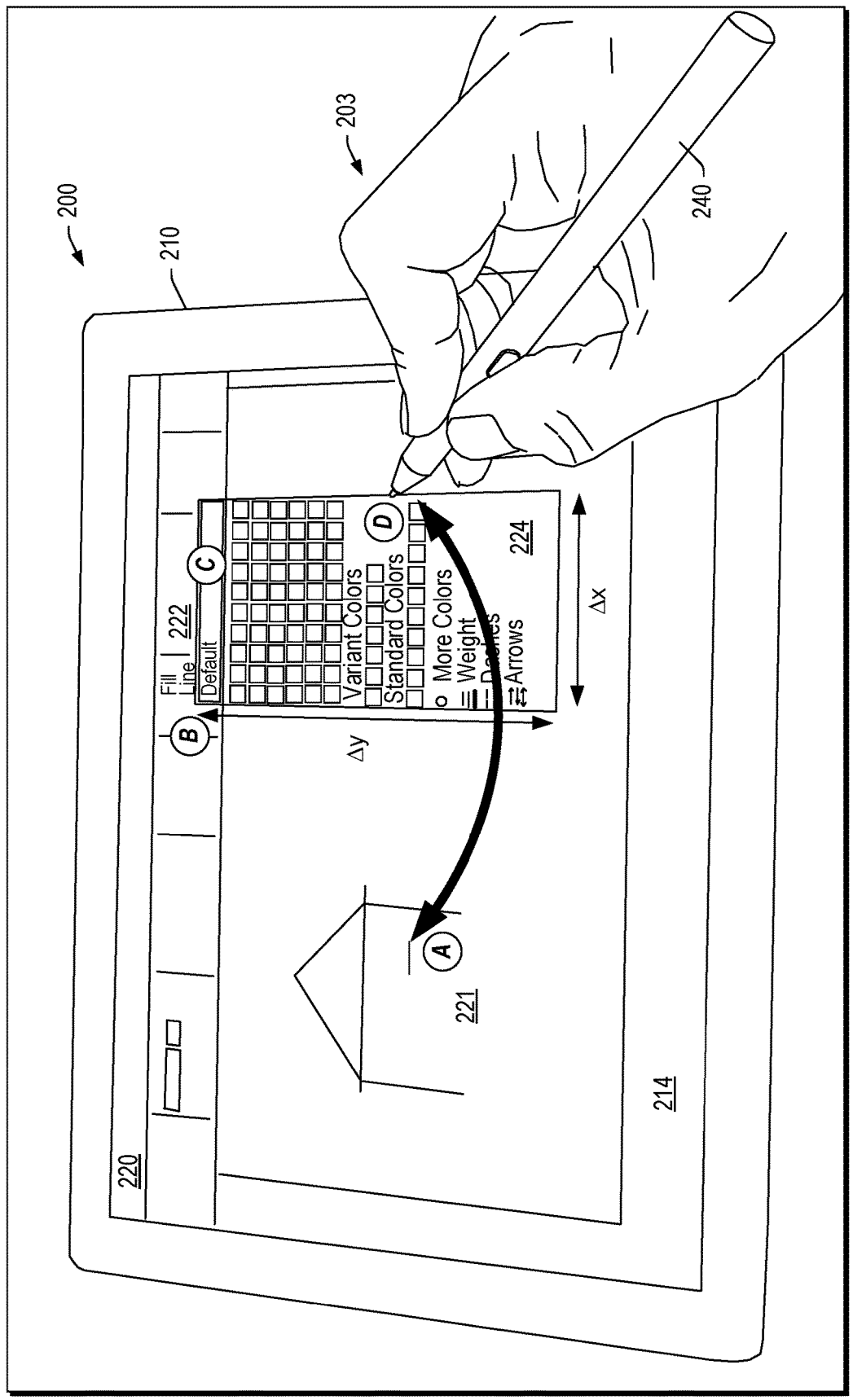
FIG. 2 is a diagram of an example of a system and an example of a drawing workflow.

FIG. 2 shows an example of a system 200 that can be utilized via a human hand 203 where the system 200 includes a computing device 210 and a stylus 240. As shown, the computing device 210 includes a display 214 that can render a graphical user interface (GUI) 220 of an application that executes using an operating system environment established by the computing device 210. In the example of FIG. 2, the application is a drawing application such as, for example, the VISIO drawing application (Microsoft Corporation, Redmond, Wash.).

As shown, the GUI 220 includes a region 221 for making drawings (e.g., a drawing panel or window), for example, by moving a nib of the stylus 240 across the display 214 in the region 221. In such an example, the drawing application can provide for various color options as to various drawing features such as lines, letters, objects, etc. In the example of FIG. 2, a GUI 224 is rendered to the display 214 that provides various options for a line, which can include colors, weights, dashes, arrows, etc. As shown, the GUI 224 occupies a considerable portion of the area of the region 221 (see, e.g., $\Delta x$ and $\Delta y$). As such, the GUI 224 may cover a portion of a drawing and/or discourage a user from utilizing a portion of the region 221, discourage use of colors, etc.

In the example of FIG. 2, where a user desires use of multiple colors to make a color drawing in the region 221, a workflow can involve multiple back-and-forth hand actions as represented by the thick double-headed arrow. For example, the user's hand 203 can draw a line by moving the nib of the stylus 240 across the display 214 (see "A"), then move the nib of the stylus 240 to a menu region 222 (e.g., a ribbon) of the GUI 220 (see "B"), navigate a menu in the menu region 222 to select "Line" using the nib of the stylus 240 (see "C"), which causes the GUI 224 to be rendered to the display 214, and then move the nib of the stylus 240 to a desired color within the GUI 224 to thereby select that color for a line drawn or to be drawn (see "D"). Thus, a user may have to move the nib of the stylus 240 to multiple positions and make multiple selections (e.g., one or more selections at each of the multiple positions). Such an approach can be inefficient, with respect to time, ergonomics and a user's attention (e.g., focus). As shown, each lift, position and touch/select can take time, can cause strain on a user's arm/wrist/hand/fingers, can demand visual acuity that may strain a user's eyes, and can detract a user from focusing on an intended task (e.g., making a drawing, editing, etc.).

In the example of FIG. 2, the GUI 224 shows various color options, which can be RGB color model options and may include gradations, intensity variations, etc. As shown, a color matrix can be rendered in the GUI 224 along with other color options such as variant colors and standard colors. As shown, a "More Colors" options exists where a color wheel, a color hexagon, a color cone, a double cone, or a color block (e.g., a color cube, etc.) may be rendered in one or more color model spaces where the user can via the hand 203 move the nib of the stylus 240 to select a desired color for a line.

In various instances, a user may want to make a drawing with few colors, such as a drawing with standard colors, while, in other instances, a user may want to make a drawing with many colors. As an example, in some instances a user may want to make a drawing without knowing what colors she wants to use a priori, while in other instances, a user may want to make a drawing using colors known a priori.

As an example, colors can be assigned names, which may be descriptive or not descriptive. For example, the color "red" may be assigned the name "red" or, for example, "color 1". In American English, some examples of color names include the following twenty-four colors (e.g., including black, white and gray or grey): red, orange, yellow, green, blue, purple, brown, magenta, tan, cyan, olive, maroon, navy, aquamarine, turquoise, silver, lime, teal, indigo, violet, pink, black, white, gray or grey. "Primary colors" can be red, yellow and blue or, for example, red, green and blue (e.g., for displays) or, for example, magenta, yellow and cyan (e.g., for printers, etc.).

As mentioned, color can be defined using a color model (e.g., a color model space or simply color space). Some examples include RGB (red, green, blue), HSL (hue, saturation, luminosity), and HSV (hue, saturation, value).

As to HSV, hue, in a color wheel, the basic color ranges from 0 to 360 degrees where both 0 and 360 degrees are red. For example, consider a color wheel where red is 0 degrees, yellow is 60 degrees, green is 120 degrees, cyan is 180 degrees, blue is 240 degrees, and magenta is 300 degrees. As to saturation, it can define how pure (e.g., versus dull) a color is, for example, ranging from 0 to 100, where 100 is fully saturated and 0 is gray. As to luminosity, it can define how light a color is, for example, ranging from 0 to 100, where 100 is as light as possible (white, regardless of the hue and saturation) and 0 is as dark as possible (black).

As to various WINDOWS OS frameworks, a colors class method exists, which is defined in the System.Windows- .Media namespace, with an assembly PresentationCore.dll, which can be utilized in the C #programming language to implement a set of predefined colors (e.g., "public sealed class Colors"). In the "Colors class", colors are represented based on the UNIX X11 named color values, which can include associated hexadecimal values. As an example, a HTML type of color coding may be utilized.

Figure 3:
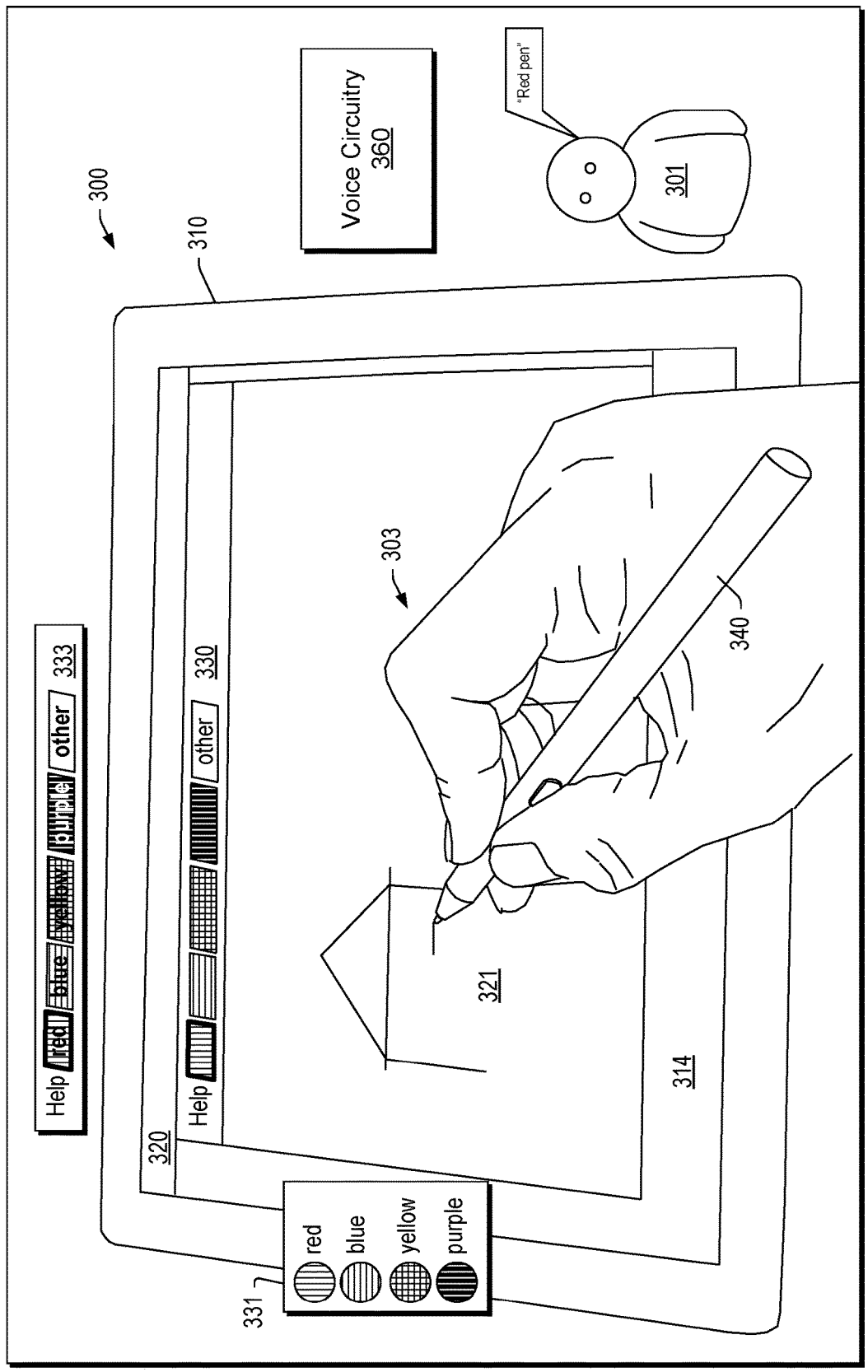
FIG. 3 is a diagram of an example of a system and an example of a drawing workflow.

FIG. 3 shows an example of a system 300 that can be utilized by a user 301 via a human hand 303 of the user 301 and a human voice of the user 301 via voice circuitry 360 where the system 300 includes a computing device 310 and a stylus 340. Such a system may help to save time, improve ergonomics, improve user attention, etc. As shown, the computing device 310 includes a display 314 that can render a graphical user interface (GUI) 320 of an application that executes using an operating system environment established by the computing device 310. In the example of FIG. 3, the application is a drawing application such as, for example, the VISIO drawing application (Microsoft Corporation, Redmond, Wash.); noting that one or more other types of applications may be implemented using the system 300.

As shown, the system 300 includes the voice circuitry 360, which can be, in part or in whole, within the computing device 310, within the stylus 340, within a remote computing system (e.g., cloud-based resources, etc.), etc.

In the example of FIG. 3, the GUI 320 is shown as including a graphic 330, which may be optional and renderable within the GUI 320 and/or to another portion of the display 314. In the example of FIG. 3, the graphic 330 may be a graphical user interface, for example, with one or more graphical controls or, for example, it may be a graphic that is not selectable, adjustable, interactive, etc. As an example, the graphic 330 may be a ribbon (e.g., and/or within a ribbon region).

In the example of FIG. 3, the user 301 can change line color on-the-fly optionally without lifting the nib of the stylus 340 from the display 314. For example, the user may utter a color (e.g., "red", "red pen", etc.) where the voice circuitry 360 causes the application to change the line color. Such an approach may be implemented without rendering of the graphic 330. However, where a user forgets one or more names of colors, the graphic 330 may be rendered to the display 314, for example, as a hint or help feature. As an example, the graphic 330 may be utilized where the voice circuitry 360 does not fully comprehend an utterance of a user. For example, consider two colors that have similar phonetics (e.g., dark green and dark gray) where the graphic 330 may be rendered with the two possible colors such that a user knows to repeat the name of the color more clearly. As an example, where a color uttered does not match a known color (e.g., or available color), a graphic may be rendered to notify the user that there is no available color match.

In comparison to the GUI 224 of the example of FIG. 2, the graphic 330, if rendered, may occupy considerably less area than the GUI 224 and may be rendered in a manner where it does not occupy an area where a drawing is likely to be within a region 321. As an example, the drawing can be specified using data such as, for example, ink data (e.g., InkML data, etc.). As shown in FIG. 3, the graphic 330 may be rendered as a strip that may be minimal in its top to bottom dimensions and may be scrollable from left to right and right to left, optionally using the voice circuitry 360. As shown, a color may be rendered with the corresponding name of the color (e.g., an assigned color name). In such an example, a user can readily comprehend the color and its name. As an example, text, if rendered within a color block, can be automatically rendered in a color that provides for suitable contrast. For example, a red color block would not use red color for text; rather, for example, black or white may be utilized.

In the example of FIG. 3, the graphic 330 includes color linings per former 37 CFR 2.52(e), which is referenced in the Federal Register, Vol. 64, No. 173, Wednesday, Sep. 8, 1999, where red or pink are represented using vertical black lines on white ground, blue is represented using horizontal black lines on white ground, violet or purple are represented using vertical brick pattern white lines on black ground, and yellow or gold are represented using horizontal hatch (crossed) black lines on white ground. In FIG. 3, a legend 331 provides for ease of identification of some examples of colors. Various other colors may appear in a graphic. And, as mentioned, a graphic may include text such as the name or names of colors. For example, consider the graphic 333, which includes text, which may be selected to be in a color that matches the name of a color or be selected to be in a color that contrasts with a background color that may be a desired color (e.g., corresponding to the name of a color).

As mentioned, the graphic 330 may be scrollable such that more colors can be rendered via scrolling. As an example, colors may be selected for a color palette a priori by a user and/or by a user selecting a theme. As an example, a default palette can be a standard color palette with names that would be likely to be understood and used by a user.

As an example, color names can be translated, as appropriate, for example, where a user changes a language setting of a computing device, an application, etc.

As to a workflow, in the example of FIG. 3, the user 301 may draw a line by moving the nib of the stylus 340 across the display 314 and utter a color where the color is immediately selected and implemented such that the line color changes for a portion of the line being drawn where the utterance was made. For example, the voice circuitry 360 can mark a time where an utterance is received via one or more microphones (e.g., a microphone, a microphone array, etc.) and then associate that marked time with a time of an application that corresponds to an x,y coordinate of the nib of the stylus 340 on the display 314 (e.g., in the region 321). In such an example, a slight time delay may exist between the marked time and the change of the line (e.g., portion thereof) as the voice circuitry 360 associates the utterance with an appropriate color.

As an example, the voice circuitry 360 may operate in one or more modes. For example, the aforementioned workflow can be for an on-the-fly mode where a line can be drawn with multiple colors using voice commands (e.g., utterances). As an example, another mode can be utilized such that a voice command applies a color to any continuously drawn feature. For example, consider a whole mode where once the user utters a color while drawing a line, upon recognition of the color, the entire line is rendered using that color. As an example, a mode may be controlled by using a button, a word, etc. For example, consider "whole red" for the whole mode or "segment red" for the on-the-fly mode. Such short utterances can allow a user to concentrate on a drawing without being distracted by large color selection GUIs (see, e.g., the GUI 224 of FIG. 2) and, optionally without having to lift a nib of a stylus from a display.

As mentioned, various parameters can be associated with a tool such as a stylus. For example, consider a drawing style such as, for example, pen, brush, etc. As an example, the voice circuitry 360 can include features for changing style of a stylus using an utterance (e.g., "pen", "brush", etc.). As an example, details of a style may be controlled via voice (e.g., "pen size 9", "brush size 8", etc.).

As an example, an approach as in the example of FIG. 3 can help to address problems with users finding, accessing, etc., location of a stylus parameters menu (e.g., ribbon, etc.) for changing one or more stylus parameters. As an example, the approach of FIG. 3 can help to minimize a need for rendering a menu, a ribbon, etc., to a display, which may provide for additional working space. For example, consider the region 222 of the display 214 of FIG. 2 being hidden, as shown in the example of FIG. 3. As shown, the region 321 in the example of FIG. 3 is greater than the region 221 in the example of FIG. 2.

As an example, a method can include automatically changing color (e.g., ink color) without having to render and/or expand a ribbon (e.g., a menu, etc.). In such an example, a system can via voice circuitry select an ink color even when an application ribbon is collapsed (e.g., ribbon region not rendered, not fully rendered, etc.).

As an example, a system can include circuitry that allows voice commands to control a stylus tool and/or color. For example, consider one or more of "Select blue Pen"/"Blue pencil"/"Yellow Highlighter"/"Pen"/"Pencil"/"Green"/etc. In such an example, once a user specifies the command, the meaning (intent) of the voice command can be extracted and processed to identify a stylus tool and/or color change requested. Once extracted, as an example, UIAutomation can be used to navigate (e.g., control) an application menu(s) to select the requested tool and/or color. For example, in an OFFICE application, if a ribbon menu is collapsed, the ribbon may be expanded (e.g., navigated without rendering), the "draw" tab selected, where a Color/Tool is matched to the phrase specified by the user and is selected.

As an example, a voice-based approach can be enabled in one or more applications that support changing of a stylus tool (e.g., pen, pencil, brush, etc.) and color. As an example, a method can include notifying a user by rendering a sound, a graphic, etc., if a tab including stylus tool and/or color is not available. As an example, a method can include notifying that a requested color or tool is not available.

As an example, voice circuitry may be enabled upon activation of a stylus. For example, where a stylus is stationary, docked, powered-off, etc., voice circuitry may enter a non-listening mode as to audio waves. In such an example, a user's privacy and/or that of others may be respected. As an example, voice circuitry may be implemented using a waiting mode where, in the waiting mode, the voice circuitry acts responsive to a key word or phrase (e.g., "hello stylus"). In response to hearing the key word or phrase, the voice circuitry can be active for recognizing voice commands (e.g., for stylus tool, color, etc.). As an example, voice circuitry may time out and revert to a waiting mode or non-listening mode in response to passage of an amount of time without interaction between a stylus and a display (e.g., passive or active), etc.

As an example, voice circuitry may become active in response to execution of an application, an application being brought to a foreground, an application being utilized in a drawing mode, etc. For example, consider a note-taking application being executed and in the foreground (e.g., highest in a GUI stack, etc.).

As an example, voice circuitry may be activated using a button, a surface, etc., of a stylus. As an example, consider pressing a button to turn on voice control, holding a button down during utterance of a voice command, etc. As an example, a combination of factors can be utilized for activation (e.g., orientation of stylus with respect to display and button push, etc.).

As an example, a gesture may be utilized on a touch screen display to activate use of voice commands and/or to de-activate use of voice commands. For example, consider the example of FIG. 3 where the hand 303 is holding the stylus 340 primarily between the forefinger and the thumb. In such an example, three fingers may be available for making a quick gesture (e.g., a two or three finger swipe, a multi-fingertip touch, etc.) while the hand 303 maintains control over the stylus 340 (e.g., can suitably hold the stylus 340). In such an example, the gesture may enable or disable control via voice commands. As an example, one gesture may enable and another, different gesture may disable. In such an example, when use of voice commands is not desired, one or more microphones may be in a non-listening mode, for example, to help assure user privacy.

As mentioned, a voice command may simply be given as a color, for example, voice input (e.g., audio input) that can be recognized as a stylus color command. For example, if the blue pen is already selected, just saying "green" can cause the voice circuitry to select the green pen. Where a drawing mode is not enabled, a voice command can assume a tool, for example, consider a pen, a marker or a brush. As an example, where a drawing mode is already selected, the color can be changed and the tool can be kept the same.

Figure 4:
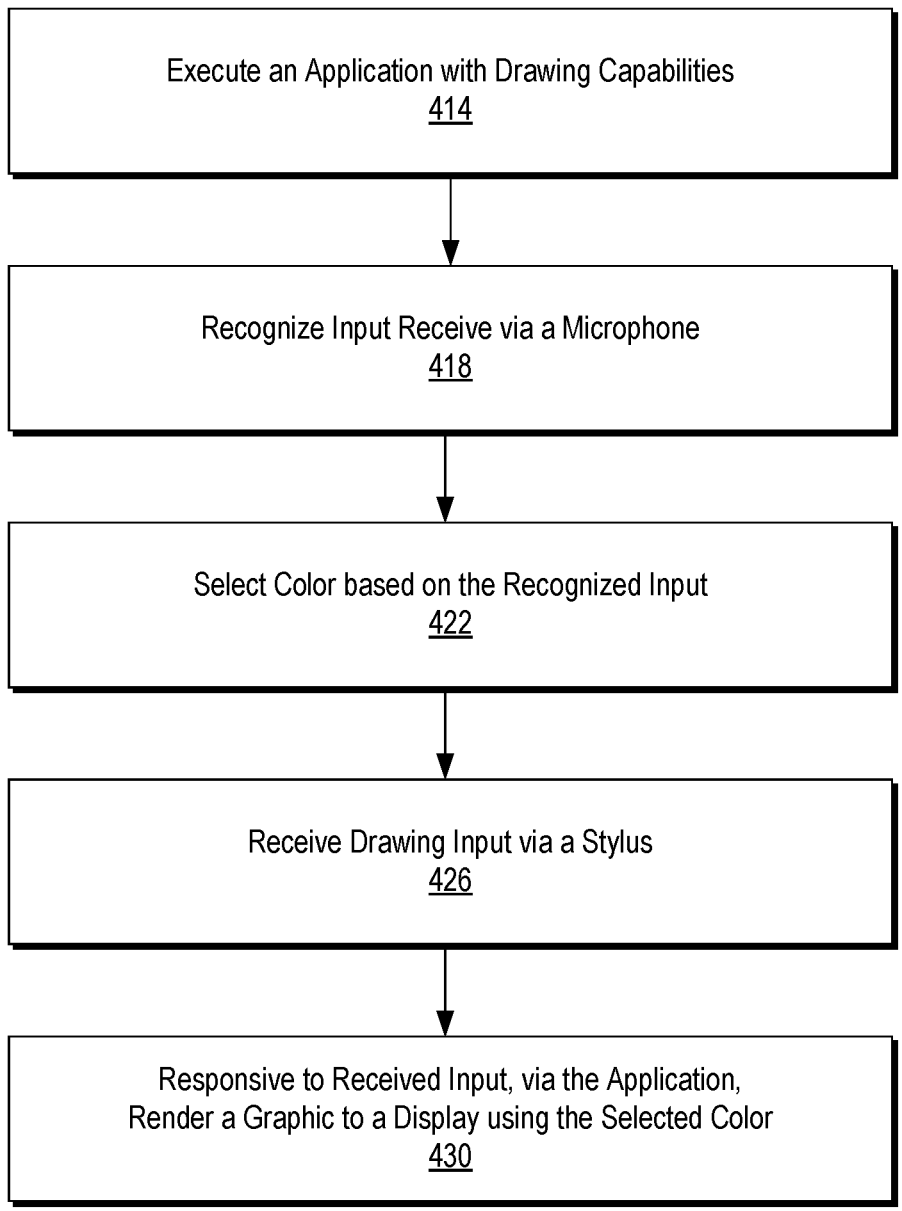
FIG. 4 is a block diagram of an example of a method.

FIG. 4 shows an example of a method 410 that includes an execution block 414 for executing an application with drawing capabilities, a recognition block 418 for recognizing input received via a microphone, a selection block 422 for selecting a color based on the recognized input, a reception block 426 for receiving input via a stylus, and a render block 430 for, responsive to the received input, via the executing application, rendering a graphic to a display using the selected color.

As an example, the method 400 can include during execution of an application with drawing capabilities, recognizing input received via a microphone; selecting a color based on the recognized input; receiving drawing input via a stylus; and, responsive to the received drawing input, via the application, rendering a graphic to a display using the selected color.

FIG. 5 shows an example of a device 510 and an example of a stylus 540.

As an example, the device 510 may include one or more processors 512, memory 514, display circuitry 516, one or more network interfaces 518, power circuitry 520 (e.g., optionally including a power source such as a battery, etc.), voice circuitry 560, orientation circuitry 570 and button circuitry 580. As shown, the device 510 may be configured, for example, as a watch, a phone, a tablet, a notebook, a desktop system, a camera, a GPS device or other device (e.g., operable to receive input via a stylus 540).

Various types of computing devices that include one or more processors, memory and a display may be characterized by one or more form factors. For example, various components of a computing device may have associated form factors (e.g., motherboard, chassis, etc.) and a computing device itself may have an associated form factor (e.g., notebook, tablet, etc.). As an example, a notebook computing device form factor may be specified as including an "A portion" (e.g., that includes a display) and a "B portion" (e.g., that includes a keyboard) where the two portions are coupled via one or more hinges and where each portion may be further specified by a length, a width and a height (e.g., or depth). As an example, a tablet computing device form factor may be specified by a length, a width and a height (e.g., or depth). As an example, a tablet computing device form factor may be referred to, at times, as a "pad" (e.g., or a "pad tablet", etc.). As an example, a watch computing device form factor may be specified with respect to a band, for example, such as a wrist band. As an example, such a device may be considered a wearable device.

Figure 6:
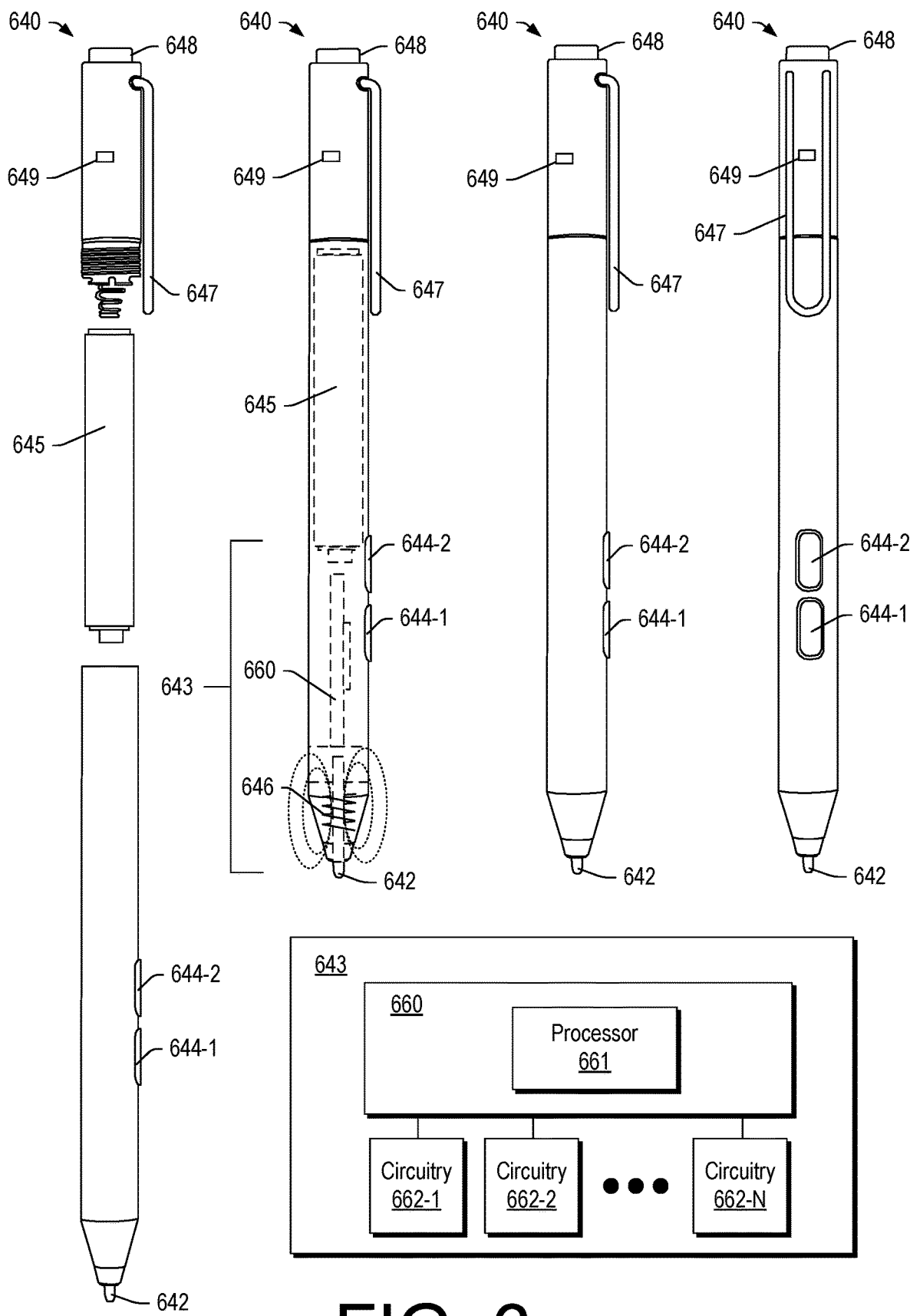
FIG. 6 is a series of diagrams of an example of a stylus.

FIG. 6 shows an example of a stylus 640 that includes a nib 642, circuitry 643, side buttons 644-1 and 644-2, one or more batteries 645, an antenna or antennas 646, and a butt end button 648. As shown in the example of FIG. 6, the stylus 640 may be separable to provide access to a chamber that can house the one or more batteries 645. For example, the stylus 640 may include two portions that form a joint where one portion includes male threads and the other portion includes matching female threads.

As shown in the example of FIG. 6, the nib 642 may include a nib shaft that can translate in a socket of the stylus 640. In such an example, pressure applied to the nib 642 may cause the nib shaft to translate where the circuitry 643 can sense the translation and output a signal that represents pressure applied to the nib 642 (e.g., a pressure level signal).

In the example of FIG. 6, the buttons 644-1, 644-2 and 648 may be operatively coupled to the circuitry 643. In such an example, actuation of one or more of the buttons 644-1, 644-2 and 648 may generate a signal or signals that the circuitry 643 can process, for example, to cause energy emission by the antenna or antennas 646 of the stylus 640. For example, the button 644-1, upon actuation, may generate a signal that corresponds to a function where the circuitry 643 can process the signal and energize the antenna or antennas 646 to emit energy with one or more characteristics indicative of the function. In such an example, the button 644-2, upon actuation, may result in emission of energy with one or more characteristics indicative of its function, which may differ from that of the button 644-1. Further, where the button 648 has an associated function, upon actuation, energy may be emitted with one or more characteristics indicative of its function. As an example, a characteristic of emitted energy may be a frequency characteristic, a timing characteristic, an amplitude characteristic, a spatial characteristic, etc.

As shown in the example of FIG. 6, the circuitry 643 may include a board 660 that includes a processor 661 such as, for example, an application-specific integrated circuit (ASIC). As an example, the board 660 may include a system-on-chip (SoC). For example, the board 660 may include the processor 661, memory (e.g., one or more of ROM, RAM, EEPROM, flash memory) and other circuitry.

As shown in the example of FIG. 6, the board 660 may be operatively coupled to circuitry 662-1, 662-2 and 662-N (e.g., where N may be zero or an integer greater than 2). As an example, a stylus may include one or more buttons with associated circuitry. As an example, circuitry may be or include a switch. For example, a switch may be a pressure sensitive switch, an optical switch, a mechanical switch, etc. As an example, the board 660 may include a bus where the circuitry 662-1, 662-2 and 662-N is operatively coupled to the bus. As an example, such a bus may be an $I^2C$ bus. In such an example, a button may include an address where, for example, actuation of the button generates a signal and an address (e.g., an identifier). In such an example, the processor 661 may associate a received button signal with a particular button and, for example, an associated function of the button (e.g., a function that depends at least in part on orientation of the stylus 640).

As an example, the stylus 640 can include voice circuitry (e.g., as one or more of the circuitries 662-1, 662-2, . . . , 662-N), which may detect an utterance via one or more microphones 649, which may be at one or more positions such as, for example, a position that may be closer to the button 648 than the nib 642. Such a position or positions may be suitable for receipt of audio waves (e.g., longitudinal waves) in air as a user's hand may leave the aft portion of the stylus 640 relatively exposed. As an example, one or more microphones may be positioned in an area that includes a clip 647. In such an example, the clip 647 may act as a barrier that can help provide an air gap for receipt of audio waves by one or more microphones. As an example, a stylus can include an opening or openings for one or more microphones where the openings may be visible and/or coded such that a user holds the stylus in a manner that does not cover one or more of the openings. As an example, a stylus may include one or more internal microphones with openings in a body of the stylus where the openings are arranged in a manner such that all of the openings are unlikely to be covered by a hand of a user during use. As mentioned, a stylus may include voice circuitry or voice circuitry may be part of a computing device, a display device, etc.

As mentioned, voice circuitry can be utilized to select a color. As an example, voice circuitry may be utilized to cause rendering of a menu, a graphic, etc. As an example, voice circuitry may be utilized to cause rendering of a help graphic to a display. As an example, one or more buttons of a stylus that includes a button or buttons may be utilized to cause rendering of a help graphic to a display. As shown in the example of FIG. 3, a help graphic can include colors and text where the text is for names of the colors. Such a help graphic can assist a user when the user desires changing a color, assigning a color, etc., whereby the user can utter the name of the desired color such that a color can be selected and utilized when drawing via a stylus such as, for example, the stylus 640 of FIG. 6.

As an example, a device can include hand rejection circuitry, for example, consider palm rejection circuitry. As an example, when a stylus is in proximity to a display, a device may trigger palm rejection circuitry. As an example, palm rejection circuitry may provide orientation information. For example, a region of a palm being "rejected" may be indicative of an orientation of a stylus; however, as it is possible to rest a palm while maneuvering a stylus to various angles, information from palm rejection circuitry may be used in conjunction with information from one or more other sources.

As an example, a user may become aware of proximity and nib recognition by a device via feedback. For example, when a nib is within a nib recognition distance, a marker may be rendered to a display at a position that corresponds to the position of the nib as best "recognized" by the device.

As an example, the stylus 640 of FIG. 6 may include BLUETOOTH™ connectivity circuitry (e.g., BLUETOOTH™ 4.0, etc.), an erase function for the side button 644-1, a right-click function for the side button 644-2 and an application initiation function for the butt end button 648. As an example, the stylus 640 may be about 10 mm in diameter and include a length of about 140 mm. As an example, a stylus may include the clip 647.

As an example, a method can include detecting orientation of a stylus with respect to a display and assigning a function to a button of the stylus based at least in part on the orientation. For example, one or more of the buttons 644-1, 644-2 and 648 of the stylus 640 may be assigned a function based at least in part on orientation of the stylus 640 with respect to a display of a device. For example, a stylus and a device with a display may include orientation circuitry (see, e.g., the orientation circuitry 570 of FIG. 5).

The stylus 640 may have a surface area of about 42 square centimeters (e.g., about 6.5 square inches). As shown, the buttons 644-1 and 644-2 are located with respect to a portion of the surface area that corresponds to an index finger tip region. For example, holding the stylus 640, a tip of an index finger may be rested in a region that is axially located between the button 644-1 and the nib 642. From this region, the tip of the index finger may be slid, lifted, etc., to at least in part cover the button 644-1 and/or the button 644-2. The stylus 640 may be considered as including an ergonomically reasonable number of side buttons actuatable via a tip of an index finger.

As an example, voice circuitry can include an analog to digital converter (ADC). For example, consider a microphone operatively coupled to an ADC that can output digitized audio data representative of audio waves received by the microphone.

As an example, circuitry that can process digitized audio input may include speech recognition (e.g., voice recognition) circuitry such as a speech recognition engine (SR engine). As an example, an SR engine may provide for recognition and translation of spoken language into text (e.g., speech to text (STT)). An SR engine may require training where, for example, an individual speaker reads text or isolated vocabulary. In such an example, the SR engine may analyze the speaker's specific voice and use it to fine-tune the recognition of that individual's speech, resulting in increased accuracy. Some types of SR engines may not use training and may be speaker independent (e.g., as opposed to speaker dependent).

Speech recognition applications may include, for example, voice user interfaces such as voice dialing (e.g., "Call home"), call routing (e.g., "I would like to make a collect call"), appliance control, search (e.g., find a podcast where particular words were spoken), simple data entry (e.g., entering a credit card number), preparation of structured documents (e.g., a radiology report), speech-to-text processing (e.g., word processors or emails), and aircraft (e.g., direct voice input).

As an example, speech recognition may be performed using one or more application programming interfaces (APIs). As an example, consider the APPLE speech recognizer (https://developer.apple.com/documentation/speech). A portion of sample code appears below for the APPLE speech recognizer:

In the foregoing example, a request is made and speech that has been recognized is returned from the speech recognizer (e.g., SR engine, etc.). Such text may be in the form of a text string, which may be a text file, etc.

As an example, a speech API may perform speech recognition by communicating with one or more remote resources (e.g., a remote server that includes SR functionality) and/or by utilizing on-device SR functionality (e.g., a local SR engine, etc.).

As an example, results of speech recognition may be utilized by an application to perform one or more operations.

As an example, a speech recognition engine can be a speech-to-text engine. As an example, a speech recognition engine can be a pattern matching engine.

As an example, for various applications, an application programming interface (API) can be accessed such as, for example, the UIAutomation API.

In the WINDOWS OS, the UIAutomation API specification includes various components such as a provider API, a client API, a UIAutomationCore.dll and an Oleacc.dll. The provider API is a set of COM interfaces that are implemented by UI Automation providers. UI Automation providers are objects that provide information about UI elements and respond to programmatic input. The client API is a set of COM interfaces that enable client applications to obtain information about the UI and to send input to controls. Client applications can use the UI Automation COM interfaces described in UI Automation Element Interfaces for Clients. As to the UIAutomationCore.dll, it is a run-time library, sometimes called the UI Automation core, that handles communication between providers and clients. As to the Oleacc.dll, it is a run-time library for Microsoft Active Accessibility and the proxy objects. The library also provides proxy objects used by the Microsoft Active Accessibility to UI Automation Proxy to support Win32 controls.

Various approaches are available for using UI Automation, for example, an approach to create support for custom controls by using the provider API, and an approach to create client applications that use the UI Automation core to communicate with, and retrieve information about, UI elements.

For the ANDROID OS, a UiAutomation class exists for interacting with a UI by simulation of user actions and introspection of screen content. The class relies on the platform accessibility APIs to introspect the screen and to perform some actions on the remote view tree. It also allows injecting of arbitrary raw input events simulating user interaction with keyboards and touch devices. The APIs exposed

```
func recognizeFile(url:NSURL) {
    guard let myRecognizer = SFSpeechRecognizer( ) else {
        // A recognizer is not supported for the current locale
        return
    }   if !recognizer.isAvailable( ) {
        // The recognizer is not available right now
        return
    }   let request = SFSpeechURLRecognitionRequest(url: url)
recognizer.recognitionTask(with: request) { (result, error) in
        guard let result = result else {
            // Recognition failed, so check error for details and handle it
            return
        }
        if result.isFinal {
            // Print the speech that has been recognized so far
            print("Speech in the file is \(result.bestTranscription.formattedString)")
        }
    }}
``` by this class are low-level to maximize flexibility when developing UI test automation tools and libraries.

As an example, an artificial intelligence approach can be utilized for uncovering and discerning ribbons, menus, controls, etc. For example, an approach may utilize an automation tool to explore behaviors of an application and how menus, etc., can be navigated and what options are available (e.g., can be exposed for control). In such an example, a framework for voice circuitry can be built for a particular application where a user may then utilize the framework to control various aspects of a stylus for input via a display, a graphics tablet, etc. As an example, an AI approach may utilize imagery such as rendered images and/or information suitable for consumption by graphics circuitry for rendering images (e.g., vector graphics, etc.).

As an example, a method can include use of an on-screen button and/or a physical button (e.g., on a computing device, a graphics tablet, a stylus, etc.) to trigger the start of a voice command (e.g., push-to-talk). As mentioned, a wake-word or wake-phrase approach may be utilized.

As an example, a trigger-less approach may be utilized where context is used rather than a deliberate action of a user. For example, one or more contextual factors may be utilized, such as, for example: a user has note-taking application open+/user is holding the stylus+/stylus is in hover range of the screen. For example, consider a stylus hovering over a display that has a GUI of an executing application rendered at a highest level (e.g., active) such that voice circuitry is automatically triggered such that a user can utter "blue" or "thicker" or "eraser" and the stylus tool and/or properties change.

As an example, consider a method that can utilize a cloud-based resource such as, for example, GOOGLE cloud speech. In such an example, a function can be called to recognize the speech using the GOOGLE cloud speech engine to return output as a text (transcript), which may then be processed to change the color/tool for a stylus.

or more network interfaces to access one or more remote resources; an opening block 718 for a user opening an application that supports tool/color change for a stylus where the stylus is not docked (e.g., being used or otherwise ready for use) where such an application may be the POWER POINT application, the VISIO application, the ADOBE ILLUSTRATOR application, etc.); a notification block 722 for notifying the user of the voice circuitry availability such that the voice circuitry can receive a user's utterance of a voice command (e.g., activation command, change command, etc.); a capture and process block 726 where the voice circuitry captures the user's voice command and processes the captured voice command using a local and/or a remote speech-to-text engine (e.g., local built-in, remote GOOGLE cloud speech, etc.); and a result block 730 for using a result from the capture and process block 726 to select a specific tool and/or a specific color for the stylus for use in conjunction with the application.

FIG. 8 shows an example of a system 800 and various examples of circuitry 809, 819, 829, 849, 860, 880, 881, 882, 883, 884, 885, 886, and 887. As shown a user 801 can utter a word, a command, a phrase, etc. For example, consider the word "eraser" such that a stylus 840 as part of the system 800 can cause a device 810 to erase one or more renderings as rendered to a display of the device 810. In such an example, the system 800 may utilize the voice circuitry 860 where the voice circuitry 860 can convert audio signals into one or more types of information to instruct the system 800.

FIG. 8 shows an example of the user 801 wearing a headset 809 with one or more microphones, the device 810 as including one or more microphones 819, and the stylus 840 as including one or more microphones 849. As shown, the headset 809, the device 810 and/or the stylus 840 can include wireless circuitry 881 and/or wired circuitry 882. As to the wired circuitry 882, the device 810 can include a connector 829 such as an audio connector, which may be utilized by a plug of a cord of a headset. For example, the

```
class GoogleCloudSpeechWrapper:
    def __init__(self):
        # Set the credentials for GCP
        * * *
        #Instantiate a speech Engine
        self.client = speech.SpeechClient( )
    def RecognizeFile(self, filename):
        transcripts = [ ]
        with io.open(filename, 'rb') as audioFile:
            content = audioFile.read( )
            audio = speech.types.RecognitionAudio(content=content)
            config = speech.types.RecognitionConfig(encoding =
enums.RecognitionConfig.AudioEncoding.LINEAR16, language_code='en-US',
max_alternatives = 25)
            response = self.client.recognize(config, audio)
            for result in response.results:
                #print('The number of alternates is: ' + len(result.alternatives))
                for alternate in result.alternatives:
                    #print('Google returned string: ' + alternative.transcript)
                    transcripts.append({ "text": alternate.transcript, "confidence":
alternate.confidence })
        return transcripts
```

In the foregoing example, consider a voice command: "select black pen". In such an example, the result therefrom can cause the following action with respect to selectable features of an executing application: "select" Color: "black" and Tool: "Pen".

Figure 7:
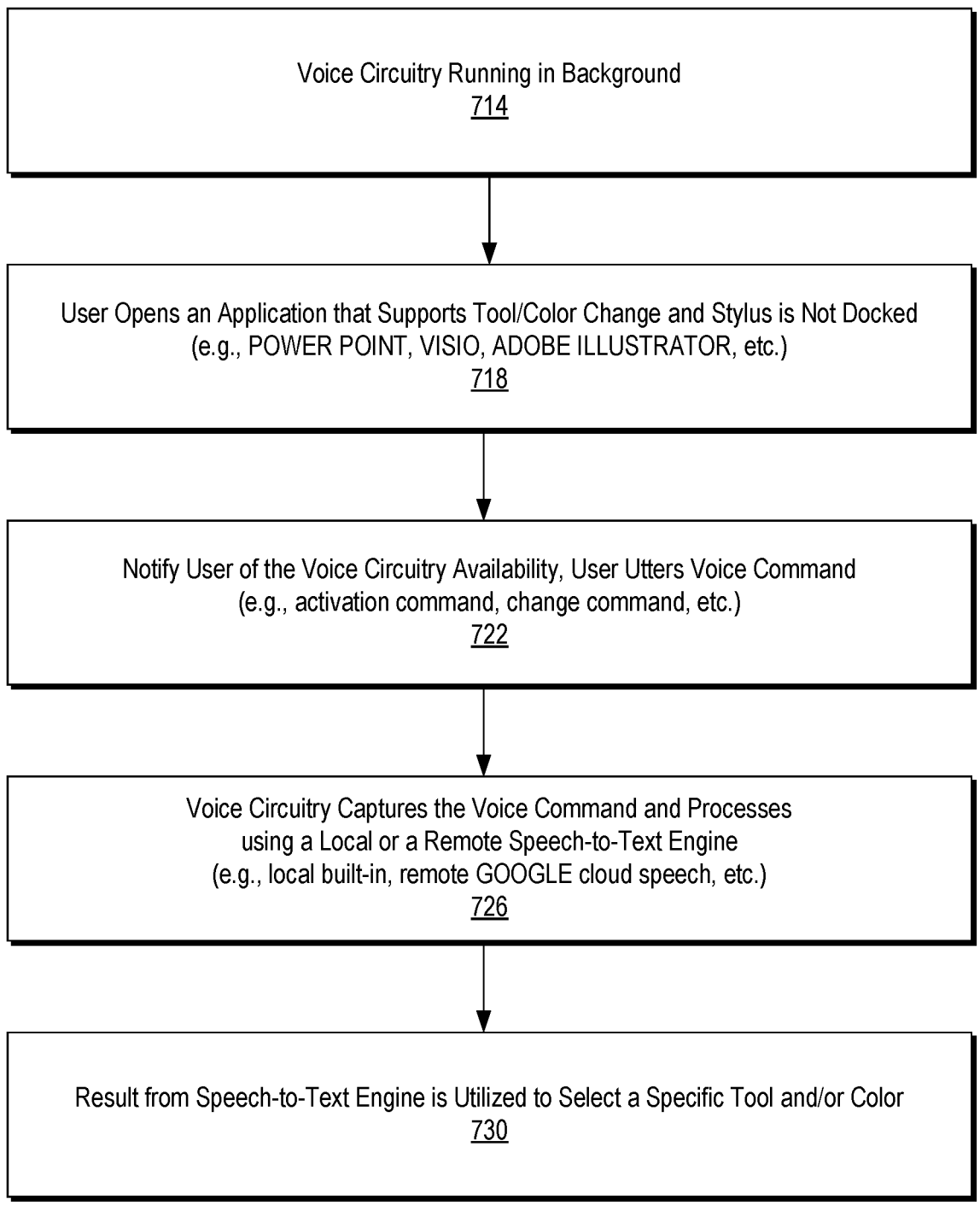
FIG. 7 is a block diagram of an example of a method.

FIG. 7 shows an example of a method 710 that includes an execution block 714 for voice circuitry running in the background on a computing device, which may include one headset 809 may be corded, include a cord, etc. As an example, the headset 809 may include features for operation in a wireless mode and/or a wired mode. As an example, a stylus may include a cord with a plug that may be an audio type of plug, a USB plug, etc. For example, where the stylus 840 includes the one or more microphones 849, it may include a cord for transmission of at least audio signals to the device 810.

As an example, a system may include features that can provide for relatively low latency operation. For example, a wired approach to transmission of audio signals may reduce latency when compared to a wireless approach to transmission of audio signals. As to such audio signals, they can be analog and/or digital. For example, a microphone can be an analog microphone that can transmit audio signals in an analog form where, for example, circuitry can convert the analog audio signals into digital form (e.g., digital audio signals). As an example, a microphone can include analog-to-digital conversion (ADC) circuitry such that the microphone can output digital audio signals.

As an example, the device 810 can include audio circuitry that can receive analog audio signals and/or digital audio signals. Such circuitry can be operable in combination with a driver such as, for example, a REALTEK high definition audio driver. As an example, audio circuitry may be operable using a driver that can be operable using an operating system that is executable to establish an operating system environment. As an example, audio circuitry may include a digital-to-analog conversion (DAC) circuitry that can converts digital signal data into an analog format where, for example, an output signal may be connected to an amplifier, headphones, or external device using one or more interconnects. As an example, audio circuitry can include a line-in connector for an analog input from a source that may provide for receipt of signal levels that can include signal levels higher than levels of a microphone.

In FIG. 8, the circuitry block 880 can include one or more types of circuitry, which, as mentioned, can include the wireless circuitry 881 and/or the wired circuitry 882. In FIG. 8, the circuitry 883 is shown as being memory (e.g., memory circuitry), the circuitry 884 is shown as being stylus circuitry 884, the circuitry 885 is shown as being audio circuitry 885, the circuitry 886 is shown as being logic circuitry 886 and the circuitry 887 is shown as being application interface circuitry 887. As an example, the stylus circuitry 884 and the audio circuitry 885 can generate output or outputs that can be processed by the logic circuitry 886. In such an example, the logic circuitry 886 can generate output or output that may, for example, be received by the application interface circuitry 887. In FIG. 8, the headset 809 (e.g., a peripheral, a human input device, etc.) can include one or more types of circuitry of the circuitry block 880, the device 810 can include one or more types of circuitry of the circuitry block 880, and/or the stylus 840 can include one or more types of circuitry of the circuitry block 880.

As an example, the application interface circuitry 887 can include memory and/or provide for access to memory that can store information such as, for example, ink data. In such an example, the application interface circuitry 887 can transmit ink data to a drawing application such that the drawing application utilizes the ink data, for example, to instruct rendering by the device 810. In such an example, where the ink data indicates a color, the drawing application can utilize the color to instruct the device 810 to render one or more graphics, etc., using the color. As an example, where the ink data indicates an erasure, the drawing application can utilize the erasure to instruct the device to render without one or more graphics, etc. (e.g., to erase a graphic, etc.).

FIG. 9 shows a listing of some examples of parameters 900 that may be included as ink data parameters (e.g., one or more stylus ink parameters, etc.). As an example, ink data can include one or more parameters as listed in the Ink Markup Language (InkML) W3C Recommendation (see, e.g., InkML of 20 Sep. 2011, etc.). As shown in FIG. 9, ink data can include channel names, dimensions, defaults, etc. The example parameters 900 include various examples of channels along with channel interpretations.

In FIG. 9, the channels include X, Y, Z (e.g., Cartesian coordinates of stylus on and/or above a "writing" surface), F (e.g., nib force), S (e.g., nib state as touching or not touching, etc.), B1 to Bn (e.g., side button states), OTx (e.g., tilt angle along x-axis), OTy (e.g., tilt angle along y-axis), OA (e.g., azimuth angle of stylus, yaw, etc.), OE (e.g., elevation angle of stylus, pitch, etc.), OR (e.g., rotation angle of stylus, etc.), C (e.g., color value as an RGB triple), CR, CG, CB (e.g., color values as in RGB color space), CC, CM, CY, CK (e.g., color values of cyan, magenta, yellow, black in color space), A (e.g., transparency), W (e.g., stroke width orthogonal to stroke), BW (e.g., brush width), BH (e.g., brush height), and T (e.g., time of a sample, sample point, etc.). As to the A channel, it can provide transparency as an integer where, for example, the value 0 represents opaque ink and the maximum permissible value represents complete transparency.

As an example, a specification may provide for describing dynamic information about stylus movement (e.g., force (pressure), tilt, etc.) and/or contextual information about capturing devices (e.g., sample rate, resolution, uniformity, etc.).

As an example, ink data can be organized in terms of ink traces, which may include attributes such as, for example, color, width, writer identification, stylus mode (e.g., eraser versus writing, etc.), etc. As an example, various attributes may be captured using a <brush> element. Traces that share the same characteristics, such as being written with the same brush, may be grouped together with a <traceGroup> element.

As an example, a system can include a corpus of terms that may provide for controlling ink data, directly and/or indirectly. As an example, where a user utters "red", ink data can be generated via a method that converts sound waves produced by the user to ink data consumable by a drawing application. As to some example terms, consider coordinate terms, force terms (e.g., nib pressure, etc.), nib state terms (e.g., touching or not touching), button terms, tilt terms, rotation terms, color terms, transparency terms, stroke terms, brush terms, time terms, etc.

As to nib state terms, consider a user that can utter "lift" to cause ink data to be generated that causes a drawing application to be instructed that a nib of a stylus is lifted when in actuality, it may be in contact with a drawing surface. In such an example, a user may wish to retain a particular position while deciding what to change as to stylus input (e.g., artistically, etc.). For example, consider a user uttering "lift" while keeping the stylus in contact (e.g., touching) a drawing surface and then uttering "brush width thicker" such that the stylus changes to a thicker brush width and then uttering "lower" such that the drawing application returns to a state where it considers the nib of the stylus to be in contact with the drawing surface to continue drawing using the thicker brush width. In such an approach, the X,Y position (e.g., and Z position) may remain constant; whereas, a menu navigation approach with multiple lifts, touches, etc., of a nib of the stylus may not guarantee that the user returns the nib to the exact same X,Y position. As to other examples, consider a user uttering "increase pressure" or "increase force", which may be uttered while drawing. In such an example, ink data may be generated that calls for rendering using a different brush style (e.g., as if more pressure were being applied). In such an example, the user can maintain an applied amount of pressure (e.g., force), which may be ergonomically advantageous for the user (e.g., depending on a user's physiological condition, dexterity, etc.).

As shown in FIG. 9, a parameter can be a time parameter (e.g., a time channel). In the example of FIG. 9, time (e.g., per the InkML standard) pertains to time of a sample point. As an example, where voice is utilized (e.g., audio input), a time may be utilized. For example, another time parameter may be utilized and/or an indicator utilized to mark a time (e.g., T) with an audio marker.

FIG. 10 shows an example of a system 1000 that includes a device 1010 and a stylus 1040, an example of a method 1090 and an example of data structures 1099, which may be stored in memory (see, e.g., the memory 883 of FIG. 8, etc.). As shown in FIG. 10, a user can maneuver the nib of the stylus 1040 with respect to a drawing surface of the device 1010 where the nib of the stylus 1040 can be touching the drawing surface of the device 1010, for example, to form a continuous curve with respect to time.

As shown, the continuous curve can be drawn over a span of time that includes time t1 as an intermediate time with a time thereafter denoted as t1+Δt. In the example of FIG. 10, the open circle and the filled circle may be rendered as one or more options that can inform a user of various times, for example, times associated with one or more actions. In the example of FIG. 10, the open circle is shown as being overlaid on the continuous curve at the time t1, which can correspond to the user's utterance of the term "blue". For example, audio circuitry can provide a time stamp and/or mark a time (e.g., as a parameter time, channel time, etc.) responsive to receipt of sound waves by a microphone. As mentioned, some latency can be involved in processing of a user's utterance. In such an example, once the utterance is processed, rendering can be performed in accordance with the utterance where the rendering can take into account the time of the utterance (e.g., commencement of the utterance, etc.).

As to the method 1090, it includes a reception block 1092 for receiving audio input, a process block 1094 for processing audio input, a set block 1096 for setting a parameter (e.g., ink data, ink metadata, etc.), and a render block 1098 for rendering one or more graphics to a display (e.g., a drawing surface, etc.) according to the set parameter.

As to the example data structure 1099, at t1, it can include an x, y position entry, a time and a color (e.g., red) and one or more subsequent x, y positions, times and colors. As shown, at time t1+Δt, the data structure 1099 sets a parameter (e.g., a channel) to be "blue" where a method can include altering one or more prior entries of the parameter of the data structure 1099. For example, the data structure 1099 entries "red" going back to time t1 can be changed to "blue". In such an example, the recognition of "blue" (e.g., as a voice command, etc.) can operate as a trigger to cause one or more entries to be altered based at least in part on the recognition of "blue". As an example, the data structure 1099 can be transmitted to a drawing application such that rendering of at least a portion of the continuous curve is rendered in blue (e.g., blue ink).

As an example, a method can include determining a size of a data structure, which may be in terms of samples, time (e.g., a time window), etc. In such an example, the size of the data structure may depend on circuitry latency. For example, where latency is longer, the data structure may be bigger (e.g., longer in time, more samples, etc.). As an example, a drawing application can include interpolation features that may interpolate between samples. As an example, a data structure can include samples and/or interpolation parameters. For example, where a user utters "straight line", an interpolation may utilize a linear approach for rendering between samples; whereas, where a user utters "curve", an interpolation may utilize a spline approach for rendering between samples.

As an example, the data structure 1099 may be considered a buffer such as an ink data buffer. As mentioned, the data structure 1099 may be stored in memory such as memory of a stylus, memory of a device, and/or memory of a peripheral such as, for example, a headset. As an example, a buffer may commence upon receipt of sound waves by a microphone. For example, if no sound waves are received as to a term or terms associated with a stylus and a drawing application, ink data may be streamed directly to a drawing application through utilization of the stylus, which can be a relatively low latency mode. Whereas, upon receipt of a sound wave or sound waves of a term or terms, a buffer can be instantiated, accessed, etc., to collect ink data to be held until the term or terms are utilized to set a parameter or parameters, which can be expected to introduce some additional latency. Once an utterance is processed to set a parameter or parameters, the buffer can flow to the drawing application and the buffer de-instantiated to thereby return to a direct or more direct mode of operation (e.g., with lesser latency, etc.).

As an example, a mode of operation may include a buffer that can be an extensible buffer that can be small where no utterances are received and that can be enlarged where an utterance is received or utterances are received. Such an extensible buffer may be a dynamic buffer that can include one or more ink data parameters based on speech recognition.

As mentioned, a method may implement a navigation approach using, for example, UI automation, and/or a method may implement an ink data approach using, for example, a buffer application. As an example, a buffer application may utilize a clipboard feature of an operating system, a drawing application, etc.

As an example, a clipboard can be a location in memory that can be used as a temporary storage area for information. As an example, a buffer application can include executable instructions to utilize a clipboard to store ink data and/or to alter ink data. In such an example, the buffer application may act to "copy and paste" the clipboard where pasting is for transference of the contents (e.g., ink data) to a drawing application.

As an example, a system can include circuitry that can implement one or more of a UI automation process and a buffer process with respect to one or more stylus parameters where such processes can be modes of operation that depend on speech recognition.

As an example, a method can include utilizing an ink data specification, which may be a standard specification and/or a custom specification. As an example, in the InkML specification, in addition to pre-defined channels, one or more other channels can be defined. As an example, an application may define one or more channels that may be utilized for purposes of controlling one or more stylus parameters via voice. As mentioned, a marker can be utilized to indicate when an utterance is received by a microphone and/or voice circuitry (e.g., audio circuitry, etc.). As an example, an application can provide for defining a channel that may be a marker channel where the marker channel can be utilized to mark a time, mark a parameter (e.g., of another channel or channels, etc.), etc. For example, consider a channel that can define a buffer starting point, a buffer reversion point, etc. In FIG. 10, the channels at t1 may be marked using a marker channel such that when "blue" is recognized as a voice command, the color channel values going back to t1 can be altered from "red" to "blue".

As to the InkML the time channel, it allows for detailed recording of timing information for each sample point within a trace, which may be utilized for one or more purposes. The time channel can be specified as a regular channel or intermittent channel. When specified as a regular channel, a single quote prefix can be used to record incremental time between successive points. The value of the time channel for a given sample point can be defined to be the timestamp of that point in the units and frame of reference specified by a "respectTo" attribute of the time channel that is defined in an associated "<traceFormat>" of the trace. As to a time channel, its <channel> element can include a "units" attribute and a "respectTo" attribute where the units attribute gives the units of the recorded time values and the respectTo attribute describes the frame of reference for those recorded values. The value of the respectTo attribute is a reference to a time stamp. Where not given, the time channel values can appear as being relative to the beginning timestamps of an individual trace in which they appear.

The following example defines a time channel whose values for a given point are the relative to the timestamp referred to by #ts1:

```
<channel name="T"
  type="integer"
  units="ms"
  respectTo="#ts1" />
```

As mentioned, a scheme may specify a number of related channels such as, for example, direction-sensitive stylus force could be named FX, FY and FZ. As an example, a user may utter a phrase that causes a change in one or more direction-sensitive stylus forces (e.g., increase FY, decrease FX, increase FX, FY and FZ, etc.).

As an example, a system can include one or more features that can recognize a user. For example, a system can include circuitry that can recognize voice input of a user A and a different user B. In such an example, two users may be operating in a common environment where both user A and user B can utilize voice commands for stylus control, etc.

As an example, ink data may be stored, transmitted, received, etc. As an example, one or more application programming interfaces (APIs) may be utilized for storage, transmission and/or reception of ink data.

As an example, an API can provide for sending/receiving ink content, optionally in addition to native content from an application. For example, consider an OneNote API that provides such features, which can operate with various accounts (e.g., individual, organizational, etc.). As an example, a voice command corpus can include one or more terms, phrases, etc., for use of such an API.

As an example, consider OneNote page content and use of a POST ~/pages API. In such an example, ink content can be written by including another part in a multipart request with Content-Type "application/inkml+xml" and content name "presentation-onenote-inkml". Consider the following example request, which for sake of brevity herein is less than 60 lines as presented below:

```
POST https://www.onenote.com/api/beta/me/notes/pages HTTP/1.1
Content-Type: multipart/form-data; boundary=soifhihofh
Content-Length: 7802; Expect: 100-continue; Content-Type: text/html
Content-Disposition: form-data; name=presentation
  <html> <head> <title>Page with InkML</title> </head> </html>
  Content-Type: application/inkml+xml
Content-Disposition: form-data; name=presentation-onenote-inkml
<?xml version="1.0" encoding="utf-8"?>
<inkml:ink xmlns:emma="http://www.w3.org/2003/04/emma"
xmlns:msink="http://schemas.microsoft.com/ink/2010/main"
xmlns:inkml="http://www.w3.org/2003/InkML">
  <inkml:definitions>
    <inkml:context xml:id="ctxCoordinatesWithPressure">
      <inkml:inkSource xml:id="inkSrcCoordinatesWithPressure">
        <inkml:traceFormat>
          <inkml:channel name="X" type="integer" max="32767" units="himetric"/>
          <inkml:channel name="Y" type="integer" max="32767" units="himetric"/>
          <inkml:channel name="F" type="integer" max="32767" units="dev"/>
        </inkml:traceFormat>
        <inkml:channelProperties>
          <inkml:channelProperty channel="X" name="resolution" value="1" units="1/himetric"/>
          <inkml:channelProperty channel="Y" name="resolution" value="1" units="1/himetric"/>
          <inkml:channelProperty channel="F" name="resolution" value="1" units="1/dev"/>
        </inkml:channelProperties>
      </inkml:inkSource>
    </inkml:context>
    <inkml:brush xml:id="br0">
      <inkml:brushProperty name="width" value="100" units="himetric"/>
      <inkml:brushProperty name="height" value="100" units="himetric"/>
      <inkml:brushProperty name="color" value="#0000FF"/>
      <inkml:brushProperty name="transparency" value="0"/>
      <inkml:brushProperty name="tip" value="ellipse"/>
      <inkml:brushProperty name="rasterOp" value="copyPen"/>
      <inkml:brushProperty name="ignorePressure" value="false"/>
      <inkml:brushProperty name="antiAliased" value="true"/>
      <inkml:brushProperty name="fitToCurve" value="false"/>
    </inkml:brush> </inkml:definitions> <inkml:traceGroup>
      <inkml:trace xml:id="st0" contextRef="#ctxCoordinatesWithPressure"
brushRef="#br0">1423 7569 3456, 1468 7288 7040, ... </inkml:trace>
```

```
<inkml:trace xml:id="st1" contextRef="#ctxCoordinatesWithPressure"
brushRef="#br0">12105 14014 2560, 11649 14071 3840, . . . </inkml:trace>
    <inkml:trace xml:id="st2" contextRef="#ctxCoordinatesWithPressure"
brushRef="#br0">9674 7756 5632, 9350 7776 8448, 8993 7925 11904, . . .
</inkml:trace>
    <inkml:trace xml:id="st3" contextRef="#ctxCoordinatesWithPressure"
brushRef="#br0">8190 7100 3328, 7857 7096 4992, 7592 7062 6144, . . .
</inkml:trace>
    <inkml:trace xml:id="st4" contextRef="#ctxCoordinatesWithPressure"
brushRef="#br0">8739 9547 1152, 8622 9531 1664, . . . </inkml:trace>
    <inkml:trace xml:id="st5" contextRef="#ctxCoordinatesWithPressure"
brushRef="#br0">11701 13399 4480, 11644 13267 6656, . . . 256</inkml:trace>
  </inkml:traceGroup>
</inkml:ink>
```

As an example, a specification may define channels to be used to describe ink traces in one or more coordinate systems, to describe one or more compression schemes, to provide supplementary information, etc. As an example, a channel or channels may describe properties of digital ink, may describe information in an ink stream, etc. As an example, a defined channel may provide information about changing lighting conditions. As an example, one or more channels may provide for ergonomic improvements for a user, which can include voice activated ergonomic improvements.

Figure 11:
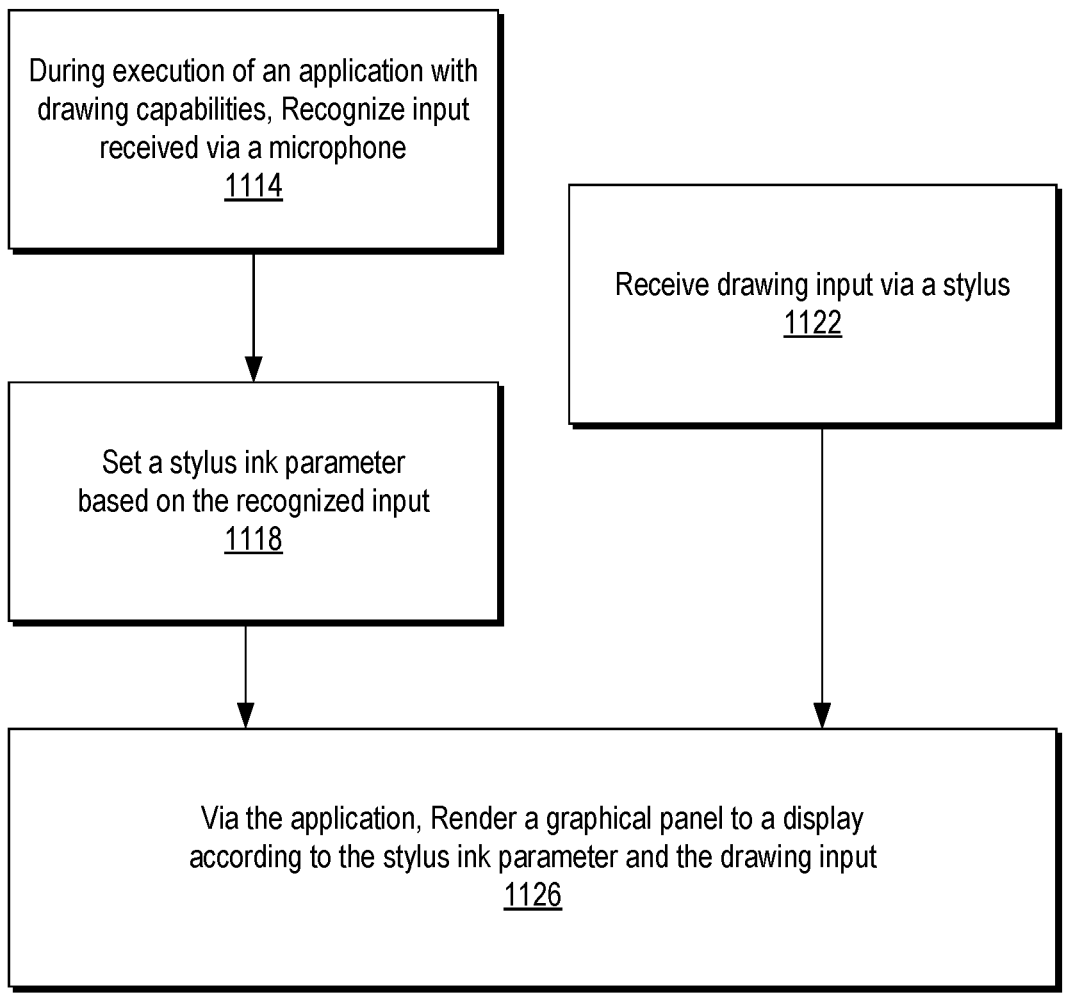
FIG. 11 is a block diagram of an example of a method.

FIG. 11 shows an example of a method 1100 that includes a recognition block 1114 for, during execution of an application with drawing capabilities, recognizing input received via a microphone; a set block 1118 for setting a stylus ink parameter based on the recognized input; a reception block 1122 for receiving drawing input via a stylus; and a render block 1126 for, via the application, rendering a graphical user interface to a display according to the stylus ink parameter and the drawing input.

As shown in the example of FIG. 3, the GUI 320 includes a region 321 where various ink is rendered, for example, according to ink data. As explained, ink data can be in one or more formats and can be generated, adjusted, etc., using one or more voice commands. As explained, a method can include utilizing a navigation approach (e.g., UI automation, etc.) or an ink data approach. As an example, a method may utilize a navigation approach for some types of voice commands and may utilize an ink data approach for some types of voice commands.

As an example, a method can include, during execution of an application with drawing capabilities, recognizing input received via a microphone; setting a stylus ink parameter based on the recognized input; receiving drawing input via a stylus; and, via the application, rendering a graphical user interface to a display according to the stylus ink parameter and the drawing input. In such an example, the recognizing and the receiving can overlap in time. For example, recognizing input received via a microphone can occur during receiving drawing input via a stylus. As an example, one or more graphics, etc., may be rendered, re-rendered, etc., responsive to recognizing input received via a microphone. For example, at least a portion of a line drawn using an application with drawing capabilities via a stylus interacting with a computing device (e.g., a touchscreen display, etc.), can change responsive to recognition of input received via a microphone where the change can be according to a stylus ink parameter or stylus ink parameters. While a line is mentioned, one or more types of graphics (e.g., primitives, vector graphics, other types of graphics, etc.) may change responsive to recognition of input received via a microphone.

As an example, drawing input received via a stylus can be tailored, controlled, etc., via input received via a microphone where, in such an example, the drawing input can be in the form of ink data, which can be at least in part based on one or more stylus ink parameters.

As an example, a method can include setting a stylus ink parameter based on the recognized input where the setting includes applying the stylus ink parameter to at least a portion of drawing input received prior to recognizing input received via a microphone.

As an example, a method can include generating a marker responsive to receiving input via a microphone where the marker indicates a time for a portion of drawing input received prior to recognizing the input received via a microphone. In such an example, the input can be a word, a phrase, a number, etc., which may be from a human utterance that spans a period in time. In such an example, an increase in signal amplitude of the microphone may trigger generation of the marker where, depending on the nature of sound that caused the increase in the signal amplitude, the marker may be deemed relevant as being related to drawing or not, which for the latter, the marker may be ignored or discarded. As an example, a method can include applying a stylus ink parameter to at least a portion of drawing input.

As an example, a stylus ink parameter can be or include a color parameter. For example, consider a method where rendering renders a graphical user interface to a display with a graphic that includes a color specified by the color parameter. In such an example, the graphic may include at least one other color (e.g., consider a line that includes a portion of one color and a different portion of another color where the line may be a contiguous line, optionally referred to as a multi-color line or multi-color graphic). As an example, a method can include recognizing input received via a microphone in a manner that occurs during receiving drawing input. As explained, a user may move a stylus across an input device (e.g., a digitizer display, a touchscreen, etc.) and make one or more utterances while moving the stylus such that a graphic is or graphics are rendered according to the one or more utterances.

As an example, a method can include setting a stylus ink parameter based on recognized input via navigating a menu of an application without rendering the menu to the display. As an example, where recognition may be uncertain, a method may include rendering a menu such as, for example, a hint menu, to a display. In such an example, the menu may be relatively small and may be rendered in a manner that does not obscure a drawing. For example, such a menu may be rendered along a ribbon region and may include selectable graphical controls or not (e.g., consider a menu or legend that can remind a user of various parameters such as color parameters, etc.).

As an example, a method can include setting a stylus ink parameter based on recognized input where the setting includes issuing at least one user interface automation application programming interface call for navigating a menu of an application that includes drawing capabilities. Such an approach can be a UI automation approach, which may utilize a tree type of structure or another type of structure to match an utterance with a stylus ink parameter, etc.

As an example, a method can include, responsive to receipt of a help command, rendering a menu of colors and names of the colors to the display. In such an example, the menu of colors and names of the colors can be a non-native menu, a menu that is not native to an application with drawing capabilities. For example, the application may include a native menu that can be rendered to a display, which may overlap or obscure a drawing panel (e.g., window) and that includes various selectable color graphical controls; whereas, a non-native menu may be smaller in area than the native menu and may be a hint menu that may or may not include selectable graphical controls. As an example, a hint menu can be a rendered graphic that is not a graphical control. Such a hint menu may provide information to a user such that the user knows what may be uttered to achieve a desired result (e.g., as to one or more stylus ink parameters, etc.).

As an example, a method can include setting a stylus ink parameter based on recognized input where the setting includes setting an InkML channel value.

As an example, a stylus ink data parameter can be a brush parameter. For example, a stylus may be considered to be a brush, akin to a paintbrush and/or other drawing utensil, which may be customizable via one or more brush parameters, etc.

As an example, a stylus can include one or more microphones. In such an example, a stylus may receive sound waves from vocal utterances of a human where one or more of the vocal utterances may correspond to one or more stylus ink parameters. As an example, a microphone of a stylus may be utilized in a method where the method includes activating the microphone responsive to receipt of input by the stylus.

As an example, a method can include recognizing input received via a microphone via transmitting audio data to a speech recognition engine. For example, consider a method that can transmit audio data as a file, files, a stream, etc., to a speech recognition engine, which may be local or remote. As an example, a local device can include a speech recognition engine. As an example, a remote device can include a speech recognition engine where the remote device includes one or more network interfaces that can receive audio data and recognize one or more commands within the received audio data. As an example, audio data may be time stamped. As an example, a time stamp may be utilized for one or more purposes, which may optionally include revising one or more rendered graphics according to a time of a time stamp. In such an example, a revision may be made in a manner that accounts for latency in operation of a speech recognition engine such that a user's intent in drawing is preserved.

As an example, one or more computer-readable storage media can include processor-executable instructions executable by a computing system to instruct the computing system to: during execution of an application with drawing capabilities, recognize input received via a microphone; set a stylus ink parameter based on the recognized input; receive drawing input via a stylus; and, via the application, render a graphical user interface to a display according to the stylus ink parameter and the drawing input.

As an example, a system can include a computing device that includes a display; a stylus; a microphone; and voice circuitry that receives audio signals via the microphone to set one or more stylus ink parameters without rendering a stylus ink parameters menu to the display, where the computing device renders a graphical user interface to the display utilizing the set one or more stylus ink parameters. In such an example, the graphical user interface can be or include a drawing panel where, for example, the stylus can draw, electronically, on the drawing panel akin to a pencil, a pen, a brush, etc., on paper, canvas, other medium or media, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 12:
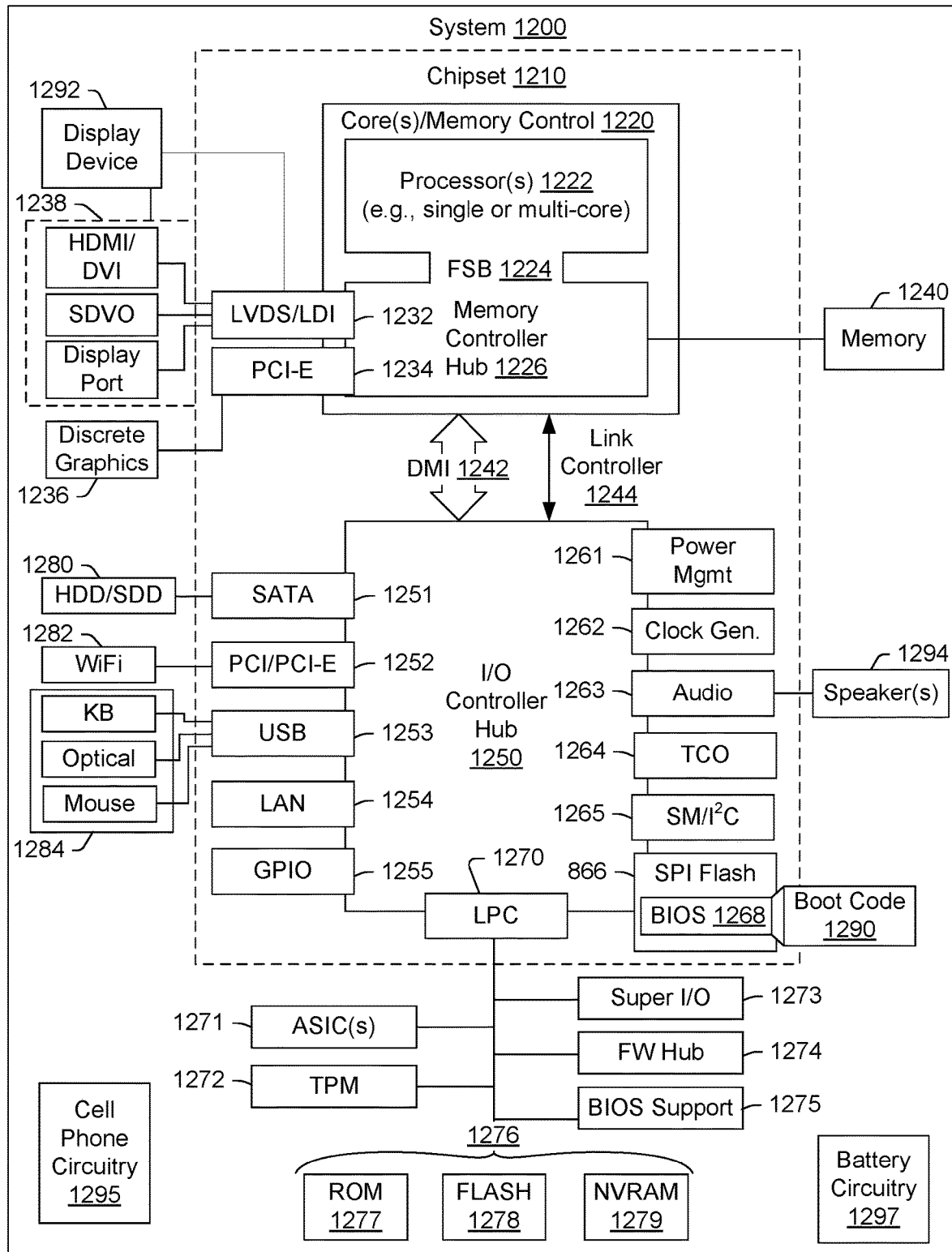
FIG. 12 is a diagram of an example of a system that includes one or more processors.

While various examples of circuits or circuitry have been discussed, FIG. 12 depicts a block diagram of an illustrative computing system 1200. As an example, the system 1200 may be a system of components that may be included in a device. As an example, one or more of the devices 510 can include one or more of the features of the system 1200. The system 1200 may be a desktop computer system, such as one of the THINKCENTER® or THINKPAD® series of personal computers sold by Lenovo (US) Inc. of Morrisville, N.C., or a workstation computer, such as the THINKSTATION®, which are sold by Lenovo (US) Inc. of Morrisville, N.C. As an example, a monitor or display device may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner. As apparent from the description herein, mobile device, a satellite, a base, a server or other machine may include other features or only some of the features of the system 1200. As described herein, a device may include at least some of the features of the system 1200.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture. As an example, a chipset may be configured as a platform controller hub (PCH), for example, the memory controller hub (MCH) 1226 may be considered a northbridge and the I/O controller hub (ICH) 1250 may be considered a southbridge where the MCH 1226 and the ICH 1250 may be components of the platform controller hub (PCH) (e.g., a PCH architecture).

As shown in FIG. 12, the memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory". As an example, one or more processors may include circuitry for memory access, for example, to access system memory.

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics (e.g., rendering of graphics to a display, etc.).

The I/O controller hub 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O controller hub 1250 may include integrated gigabit Ethernet controller lines multiplexed with a PCI-E interface port. Other network features may operate independent of a PCI-E interface.

The interfaces of the I/O controller hub 1250 provide for communication with various devices, networks, etc. For example, the SATA interface 1251 provides for reading, writing or reading and writing information on one or more drives 1280 such as HDDs, SDDs or a combination thereof. The I/O controller hub 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, a touchpad, mice and various other devices (e.g., cameras, phones, storage, media players, etc.). On or more other types of sensors may optionally rely on the USB interface 1253 or another interface (e.g., I²C, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268.

Again, as described herein, a satellite, a base, a server or other machine may include fewer or more features than shown in the system 1200 of FIG. 12. Further, the system 1200 of FIG. 12 is shown as including cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   during execution of an application with drawing capabilities, generating a marker responsive to receiving input via a microphone and recognizing the input received via the microphone, wherein the marker indicates a time for a portion of drawing input received via a stylus prior to the recognizing;
   setting a stylus ink parameter based on the recognized input;
   applying the stylus ink parameter to the portion of drawing input;

receiving another portion of drawing input via the stylus; and via the application, rendering a graphical user interface to a display according to the stylus ink parameter and the portions of drawing input.

2. The method of claim 1, wherein the recognizing and the receiving another portion of drawing input via the stylus overlap in time.

3. The method of claim 1, wherein the stylus ink parameter comprises a color parameter.

4. The method of claim 3, wherein the rendering renders the graphical user interface to the display with a graphic that comprises a color specified by the color parameter.

5. The method of claim 4, wherein the graphic comprises at least one other color.

6. The method of claim 5, wherein the recognizing occurs during the receiving of the drawing input.

7. The method of claim 1, wherein the setting comprises navigating a menu of the application without rendering the menu to the display.

8. The method of claim 1, wherein the setting comprises issuing at least one user interface automation application programming interface call for navigating a menu of the application.

9. The method of claim 1, comprising, responsive to receipt of a help command, rendering a menu of colors and names of the colors to the display.

10. The method of claim 9, wherein the menu of colors and names of the colors is not native to the application.

11. The method of claim 1, wherein the setting comprises setting an InkML channel value.

12. The method of claim 1, wherein the stylus ink data parameter comprises a brush parameter.

13. The method of claim 1, wherein the stylus comprises the microphone.

14. The method of claim 13, comprising activating the microphone responsive to receipt of input by the stylus.

15. The method of claim 1, wherein the recognizing comprises transmitting audio data to a speech recognition engine.

16. One or more non-transitory computer-readable storage media comprising processor-executable instructions executable by a computing system to instruct the computing system to:

during execution of an application with drawing capabilities, generate a marker responsive to receipt of input via a microphone and recognize the input received via the microphone, wherein the marker indicates a time for a portion of drawing input received via a stylus prior to the recognition;

set a stylus ink parameter based on the recognized input;

applying the stylus ink parameter to the portion of drawing input;

receive another portion of drawing input via the stylus; and via the application, render a graphical user interface to a display according to the stylus ink parameter and the portions of drawing input.

17. A system comprising:

a computing device that comprises a display, a processor and memory;

a stylus;

a microphone; and processor-executable instructions stored in the memory executable to instruct the system to:

during execution of an application with drawing capabilities, generate a marker responsive to receipt of input via the microphone and recognize the input received via the microphone, wherein the marker indicates a time for a portion of drawing input received via the stylus prior to the recognition;

set a stylus ink parameter based on the recognized input;

applying the stylus ink parameter to the portion of drawing input;

receive another portion of drawing input via the stylus; and via the application, render a graphical user interface to a display according to the stylus ink parameter and the portions of drawing input.

18. The method of claim 1, wherein the portion of drawing input and the additional portion of drawing input correspond to a continuously drawn feature.

19. The method of claim 18, wherein the continuously drawn feature is a continuous curve.

20. The one or more non-transitory computer-readable storage media of claim 16, comprising processor-executable instructions executable by a computing system to instruct the computing system to:

while the stylus is in contact with a drawing surface, recognize a lift command input received via the microphone and then recognize a lower command input received via the microphone, wherein the application changes from a first state where it considers the stylus to be in contact with the drawing surface to a second state where it considers the stylus to not be in contact with the drawing surface to a third state where it considers the stylus to be in contact with the drawing surface.

* * * * *